US011925855B1

United States Patent
Malka et al.

(10) Patent No.: US 11,925,855 B1
(45) Date of Patent: Mar. 12, 2024

(54) ATTACHABLE APPARATUS FOR AN OBJECT CONFIGURABLE TO SENSE MOTION OF THE OBJECT USED IN A GAME EVENT

(71) Applicant: Malka Net Pty Ltd, Moorabbin (AU)

(72) Inventors: Amir Malka, Haifa (IL); Sagui Malka, Kiryat Bialik (IL)

(73) Assignee: Malka Net Pty Ltd, Moorabbin (AU)

( * ) Notice: Subject to any disclaimer, the term of this patent is extended or adjusted under 35 U.S.C. 154(b) by 0 days.

(21) Appl. No.: 18/070,712

(22) Filed: Nov. 29, 2022

(51) Int. Cl.
*A63F 13/24* (2014.01)
*A63F 13/211* (2014.01)

(52) U.S. Cl.
CPC .......... *A63F 13/24* (2014.09); *A63F 13/211* (2014.09)

(58) Field of Classification Search
None
See application file for complete search history.

(56) References Cited

U.S. PATENT DOCUMENTS

| | | | | |
|---|---|---|---|---|
| 8,608,167 B2* | 12/2013 | Raymond | ............ | A63B 63/007 116/222 |
| 9,958,903 B2* | 5/2018 | Gustavsson | ........... | G06F 3/0383 |
| 9,987,538 B1* | 6/2018 | Crosby | ............. | A63B 71/0622 |
| 11,331,563 B2* | 5/2022 | Oryl | ........................ | A63H 33/26 |
| 2003/0034611 A1* | 2/2003 | Lacy | ..................... | A63F 7/0612 273/317.3 |
| 2015/0182797 A1* | 7/2015 | Wernow | ................. | G16H 20/30 482/8 |
| 2017/0193795 A1* | 7/2017 | Laidlaw | .................. | H04L 67/10 |
| 2017/0308165 A1* | 10/2017 | Erivantcev | ............. | G06F 3/016 |
| 2018/0133588 A1* | 5/2018 | Mendicino | ............ | A63F 9/0278 |
| 2018/0264347 A1* | 9/2018 | Tran | ........................ | H04Q 9/00 |

\* cited by examiner

*Primary Examiner* — Peter J Iannuzzi

(57) ABSTRACT

An apparatus reattach-able to a container, the apparatus including a processor and one or more sensors operatively attached to the processor. The one or more sensors configurable upon a toss applied to the container by a user, to sense a data of the number of rotations in midair of the container. The distance travelled by the container in midair to landing on a surface and the settled orientation position of the container upon landing on a surface. A communication interface configured to transmit the data sensed during a game event to a game application running on a computing device. To provide an indication of a score to the user responsive to a comparison of the data to one or more game criteria of the game application.

22 Claims, 10 Drawing Sheets

ATTACHABLE APPARATUS FOR AN OBJECT CONFIGURABLE TO SENSE MOTION OF THE OBJECT USED IN A GAME EVENT

BACKGROUND

The present disclosure, in some embodiments thereof, relates to an apparatus and, more specifically to the apparatus being re-attachable to an object and the apparatus configurable to sense motion of the object used in a game event, but not exclusively, to the game event but to other functions of the game event.

In May 2016, participating in his school annual talent show, a senior high school student called Michael Senatore enters a stage carrying a partially filled bottle of water. He stands straight, focuses on a table standing in front of him and throws the bottle in the air with a spin. The bottle flips once and lands upright on the table. The clip of Michael Senatore filmed with a smartphone camera, became viral on the internet, and followed by similar clips, kids around the globe attempting the "water bottle flipping challenge" themselves.

SUMMARY

It is an object of the present invention to provide an apparatus, a system, a computer program product, a phone application and a method for to an apparatus and, more specifically to the apparatus being re-attachable to an object and the apparatus configurable to sense motion of the object used in a game event, but not exclusively, to the game event but to other functions of the game event.

An apparatus reattach-able to a container, the apparatus including a processor and one or more sensors operatively attached to the processor. The one or more sensors configurable upon a toss applied to the container by a user, to sense a data of the number of rotations in midair of the container. The distance travelled by the container in midair to landing on a surface and the settled orientation position of the container upon landing on a surface. A communication interface configured to transmit the data sensed during a game event to a game application running on a computing device. To provide an indication of a score to the user responsive to a comparison of the data to one or more game criteria of the game application.

An elastic holster may be configured to attach the apparatus to a cap end of the container, a midsection of the container or the bottom end of the container. One or more game criteria of the game may define the amount of liquid or a moveable object placed in the container. The height to which the container is to be tossed, the number of rotations in midair of the container and the settled orientation position of the container upon landing on a surface. The settled orientation position of the container may be a cap end of the container, a midsection of the container or a bottom end of the container.

The one or more sensors may be a micro-electromechanical system (MEMS) accelerometer, a MEMS gyroscope, MEMS compass, MEMS barometer or MEMS magnetic field sensor. The cross sectional shape of the container may be a spherical shape, triangular shape, rectangular shape or any polynomial shape.

The processing of the processor may provided from the computing device and/or a cloud computing provision. The comparison of the data to one or more of the game criteria of the game application may be provided from the processor, the computing device and/or a cloud computing provision. The indication of a score to the user may be provided on a graphical user interface (GUI) of the processor, the computing device and/or a cloud computing provision.

An apparatus comprising a container including a resealable cap end. A processor and one or more sensors electrically attached to the processor. a communication interface electrically attached to the processor and a housing mechanically attached to the container. The housing houses and is mechanically attached to the container, the processor, the one or more sensor and the communication interface.

The communication interface may be configured to transmit a data sensed during a game event to a game application running on a computing device. To provide an indication of a score to the user responsive to a comparison of the data to one or more game criteria of the game application. The one or more sensors may be configurable upon a toss applied to the container by a user to sense a data of one or more of the number of rotations in midair of the container. Measure the distance travelled by the container in midair to landing on a surface and the settled orientation position of the container upon landing on a surface. The housing and the container forms a monolithic structure. A cross sectional shape of the container may be a spherical shape, triangular shape, rectangular shape or any polynomial shape.

A sealing bottle cap assembly for a bottle having an open mouth and a neck extending down from the open mouth. The reusable sealing bottle cap assembly consisting essentially of a cap having an enclosed upper portion for enclosing the open mouth of the bottle. A depending skirt extending straight downwardly from the enclosed upper portion of the cap for securing the cap around a neck of a bottle for partly sealing an open mouth of the bottle. A controller embedded in the reusable sealing bottle cap. A user interface operatively connected to the controller. The user interface adapted to enable a user to select the parameters of a game event displayed on a display of a computing device.

The sealing bottle cap assembly may further include a sensor unit configured to sense a data of a motion of the reusable sealing bottle cap. A communication interface configured to transmit the data sensed during the game event to a game application running on a computing device. To provide an indication of a score to the user responsive to a comparison of the data to one or more game criteria of the game application.

A method for a game event using a container attached to a processor that includes one or more sensors. Upon a toss applied to the container by a user, to sense and calculate a data of one or more of the number of rotations in midair of the container, the distance travelled by the container in midair to landing on a surface and the settled orientation position of the container upon landing on a surface. To communicate the data sensed and calculated during the game event to a game application running on a computing device. To indicate a score to the user responsive to comparing the data to one or more game criteria of the game application.

The game criteria of the game may define the amount of liquid or a moveable object to be placed in the container. The height to which the container is to be tossed, the number of rotations in midair of the container and the settled orientation position of the container upon landing on a surface. The settled orientation position of the container may be one or more of a cap end of the container, a midsection of the container and a bottom end of the container.

A processing of the processor may be provided from the computing device and/or a cloud computing provision. The comparison of the data to the game criteria of the game application may be provided from the processor, the computing device and a cloud computing provision. The method may further include indicating a score to the user on a graphical user interface (GUI) of the processor, the computing device and/or a cloud computing provision. The one or more sensors may be a micro-electromechanical system (MEMS) accelerometer, a MEMS gyroscope, MEMS compass, MEMS barometer or MEMS magnetic field sensor.

According to a first aspect, an apparatus re-attachable to a container or bottle, where movement of the container enables a selection from a menu displayed on a display to enable a player or user to select the parameters of a game event.

According to a second aspect, a sealing bottle or container cap assembly for a bottle having an open mouth and a neck extending down from the open mouth. The reusable sealing bottle cap assembly including an enclosed upper portion for enclosing the open mouth of the bottle and a depending skirt extending straight downwardly from the enclosed upper portion of the cap for securing the cap around a neck of a bottle to seal an open mouth of the bottle. The reusable sealing bottle cap including a controller embedded in the reusable sealing bottle cap. The controller interfaceable with a computing device. The controller enables a selection from a menu displayed on a display of the computing device to enable a player or user to select the parameters of a game event.

According to a third aspect a sensing of the dynamics of forces and their effect on motion that most aptly applies but is not limited to a "water bottle flipping challenge" by virtue of a bottle or container being partially filled with a liquid or with another moveable object such as a ball for example.

According to a fourth aspect in a game event by one or more players, a comparison is provided between a game criteria of the game event with the sensing and calculating of the dynamic movement of a bottle or container tossed by the one or more players during the game event. The game criteria of the game event to the one or more players may include for example the minimum height for a bottle to reach, the number of turns of the bottle midair and the bottle to land cap end or bottom end. The comparison can then be indicated as a score to the one or more players for example on a graphic user interface (GUI), as an ongoing score of ongoing challenges included in a game event.

According to a fifth aspect, the sensing and calculating of the dynamic movement of a bottle or container tossed by the one or more players may be may be conveyed via a cloud or wireless hotspot near a player to another player in another location. The conveying of the processing of the sensing may for example may provide an animated graphic on a computing device of the other player. The animated graphic may include an avatar, an icon or a figure that represents a player, the motion of the container and final landing orientation onto a defined surface. The conveying of the processing may be in near real-time of a "bottle flip game" to the other user or as a provision for an action replay that may be streamed or shared on a social media platform.

The foregoing and other objects are achieved by the features of the independent claims. Further implementation forms are apparent from the dependent claims, the description and the figures.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1A:
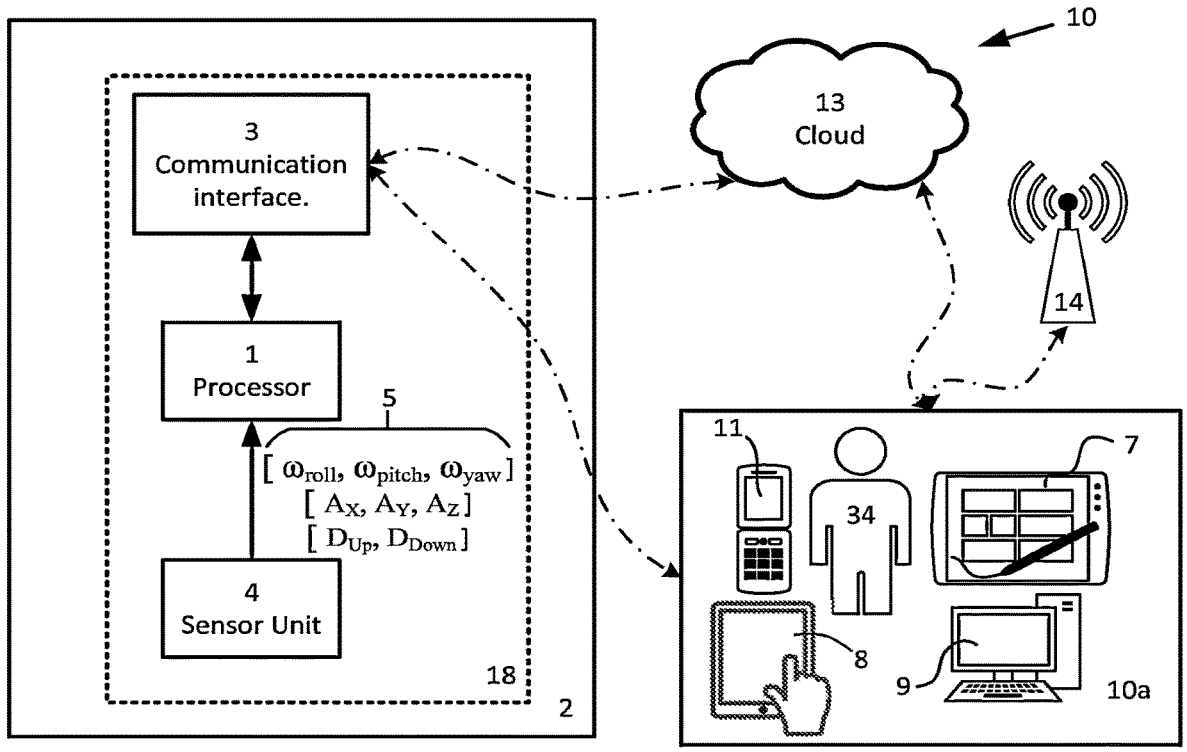
FIG. 1A shows a block diagram of a game event, in accordance with some embodiments.

The present disclosure, in some embodiments thereof, relates to an apparatus and, more specifically to the apparatus being re-attachable to an object and the apparatus configurable to sense motion of the object used in a game event, but not exclusively, to the game event but to other functions of the game event.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By way of introduction aspects of the disclosure below, describe a sensing of the dynamics of forces and their effect on motion that most aptly applies but is not limited to the "water bottle flipping challenge" by virtue of a bottle being partially filled with a liquid or with another moveable object. Further, in a game event by one or more players, a comparison is provided between a game criteria of the game event with the sensing and calculating of the dynamic movement of a bottle tossed by the one or more players during the game event. The game criteria of the game event to the one or more players may include for example the minimum height for a bottle to reach, the number of turns of the bottle midair and the bottle to land cap end or bottom end. The comparison can then be indicated to one or more players for example on a graphic user interface (GUI), as an ongoing score of ongoing challenges included in a game event. The first player to complete the required number of challenges and/or a particular score is the winner for example.

Reference is now made to FIG. 1A, which shows a block diagram of a game event 10, in accordance with some embodiments. Game event 10 includes a container 2 that is mechanically re-attachable to apparatus 18 by an elasticated belt (not shown). Apparatus 18 may include a battery to power processor 1, communication interface 3 and sensor unit 4 of apparatus 18.

Container 2 may be a plastic or non-breakable bottle that includes a resealable cap through which an amount of liquid may be required to be sealed inside container 2 for game event 10. The liquid may be a Newtonian or non-Newtonian fluid or liquid. Apparatus 18 includes a processor 1 that is bi-directionally connected to communication interface 3 and receives input 5 from sensor unit 4 that may include a sensor interface between sensor unit 4 and processor 1. Input 5 includes angular velocities $\omega_{roll}$, $\omega_{pitch}$, $\omega_{yaw}$, accelerations $A_X$, $A_Y$ and $A_Z$ and distances $D_{Up}$, $D_{Down}$. Input 5 may also include other sensed parameters such a barometric pressure [Pascal's (Pa)], altitude h (meters), temperature T (kelvin) and sensed radio frequency identification (RFID) signals f. Therefore, sensing of barometric pressure may be used to measure height of container 2 based on atmospheric pressure. A compass sensor may also connect to the gyroscope and accelerometer sensors used to sense angular velocities $\omega_{roll}$, $\omega_{pitch}$, $\omega_{yaw}$ and accelerations $A_X$, $A_Y$ and $A_Z$ respectively and also to enable accurate measurements.

Processor 1 may be a microprocessor, single chip computer or a digital signal processor (DSP). Processor 1 further include and/or be operatively connected to a random access (RAM), read only memory (ROM) and/or a cloud storage memory. Communication interface 3 may connect wirelessly (shown by dashed lines) to cloud 13 and mobile phone 11, tablet 7 and personal computer (PC) 9 that are included in game area 10a that a user or player 34 may utilize in game event 10. Cloud 13 may also connect wirelessly to mobile phone 11, tablet 7 and PC 9. Mobile phone 11, tablet 7, commercial touch screen monitor (CTSM) 8 and PC 9 may also connect to a wireless hotspot 14 or to a router by a cable or may connect wirelessly. Wireless hotspot 14 may also connect directly to cloud 13. Communication interface 3 may also connect to cloud 13 and mobile phone 11, tablet 7, CTSM 8 and personal computer (PC) 9 by WiFi™, Bluetooth™ and/or by near field communication (NFC).

Figure 1B:
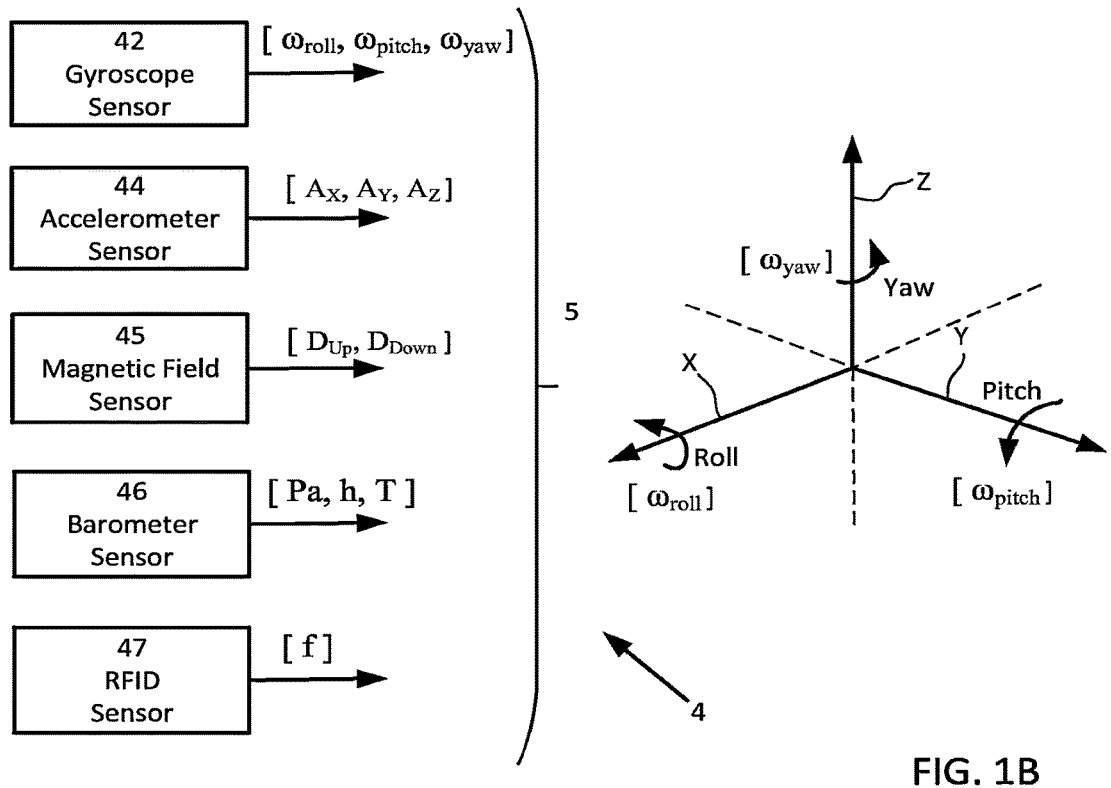
FIG. 1B shows a block diagram of more details of a sensor unit and a coordinate system, in accordance with some embodiments.

Reference is now made to FIG. 1B, which shows a block diagram showing more details of sensor unit 4 and a coordinate system, in accordance with some embodiments. Sensor unit 4 includes a magnetic field sensor 45 that provides a sensed output $D_{UP}$ representative of the distance travelled upwards by container 2 and the distance $D_{DOWN}$ of the downwards travel of container 2. An accelerometer sensor 44 that measures the acceleration ($A_X$, $A_Y$ and $A_Z$) in meters (m) per second (s) each second (ms$^2$) of container 2 with respect to the three axes X, Y and Z of apparatus 18 attached to container 2 by an elasticated belt (not shown). The acceleration includes the downward acceleration due to gravity as well as acceleration because of a force applied to container 2 by a user or player. Axis Z may be representative of the vertical or longitudinal axis of container 2 that runs from the cap end to the bottom end of container 2. Whereas axes X and Y are the latitudinal axes at right angle to each other.

Barometer sensor 46 may be utilized in in game area 10a to measure atmospheric pressure (measured in Pascals (Pa). Sensing of barometric pressure may be used to measure height of container 2 based on atmospheric pressure. Atmospheric pressure is caused by the gravitational attraction of the planet on the atmospheric gases above the surface and is a function of the mass of the planet, the radius of the surface, and the amount and composition of the gases and their vertical distribution h in the atmosphere. The planetary rotation and local effects such as wind velocity, density variations due to temperature T and variations in atmosphere composition modify atmospheric pressure may have different effects upon the dynamic movement of container 2 tossed player 34 during a game event compared to another player 34 in a different location.

Radio Frequency (RF) sensor 47 may be utilized in a tracking and timing system that may be included in game area 10a. The tracking and timing system operably electromagnetically attached to processor 1 by communications interface 3. The tracking and timing system may include one or more antennas that are designed for a particular operating frequency f. In the case of low or medium frequencies, antennas of the tracking and timing system may consist of wire loops incorporated into mats or on posts included in game area 10a. For ultra-high frequency (UHF) systems, the antennas may consist of patch antennas that are protected in the mats and posts located in various places of game area 10a. An active version of the tracking and timing system has the inclusion of a battery or power source (localized solar panel for example). The active version may then include a simple wire loop that serves as a trigger to turn on the transponder of the tracking and timing system so that RF sensor 47 receives the relatively strong signal from the transponder via communications interface 3. Therefore, in a game event data from RF sensor 47 may be used to track, calculate time, distance and velocity of container 2.

Gyroscope sensor 42 is utilized to measure the angular (w, radians per second) velocities $\omega_{roll}$, $\omega_{pitch}$, $\omega_{yaw}$, of container 2 about axes X, Y and Z respectively. Input 5 to processor 1 may include digitized data values by analogue to digital converters (ADCs) of analogue voltage values sensed by the sensors of sensor unit 4. The digitized data values being representative of angular velocities $\omega_{roll}$, $\omega_{pitch}$, $\omega_{yaw}$, accelerations $A_X$, $A_Y$ and $A_Z$ and distances $D_{Up}$, $D_{Down}$ in midair from a toss from the user applied to container 2. The processing of processor 1 may then calculate from the digitized data values sensed in game event 10 to include the number of rotations in midair of container 2. The height and the distance ($D_{UP}+D_{DOWN}$) travelled by container 2 in midair to landing on a surface and the settled orientation position of container 2 upon landing on a surface.

The settled orientation position of container 2 may for example be on the cap end of container 2, the mid-section of container 2 or on the bottom end opposite the cap end of container 2. The processing may be performed by a cloud computing provision of cloud 13, mobile phone 11, tablet 7, CTSM 8 and personal computer (PC) 9 that are included in game area 10a that a user or player 34 may utilize in game event 10. Magnetic field sensor 45, accelerometer sensor 44 and gyroscope sensor 42 may be implemented as a microelectromechanical systems (MEMs) electrically connected together or as an integrated monolithic micro-electromechanical system (MEM). A compass sensor (not shown) may also connect to the gyroscope sensor 42 and accelerometer sensor 44 used to enable accurate measurements.

Figure 2A:
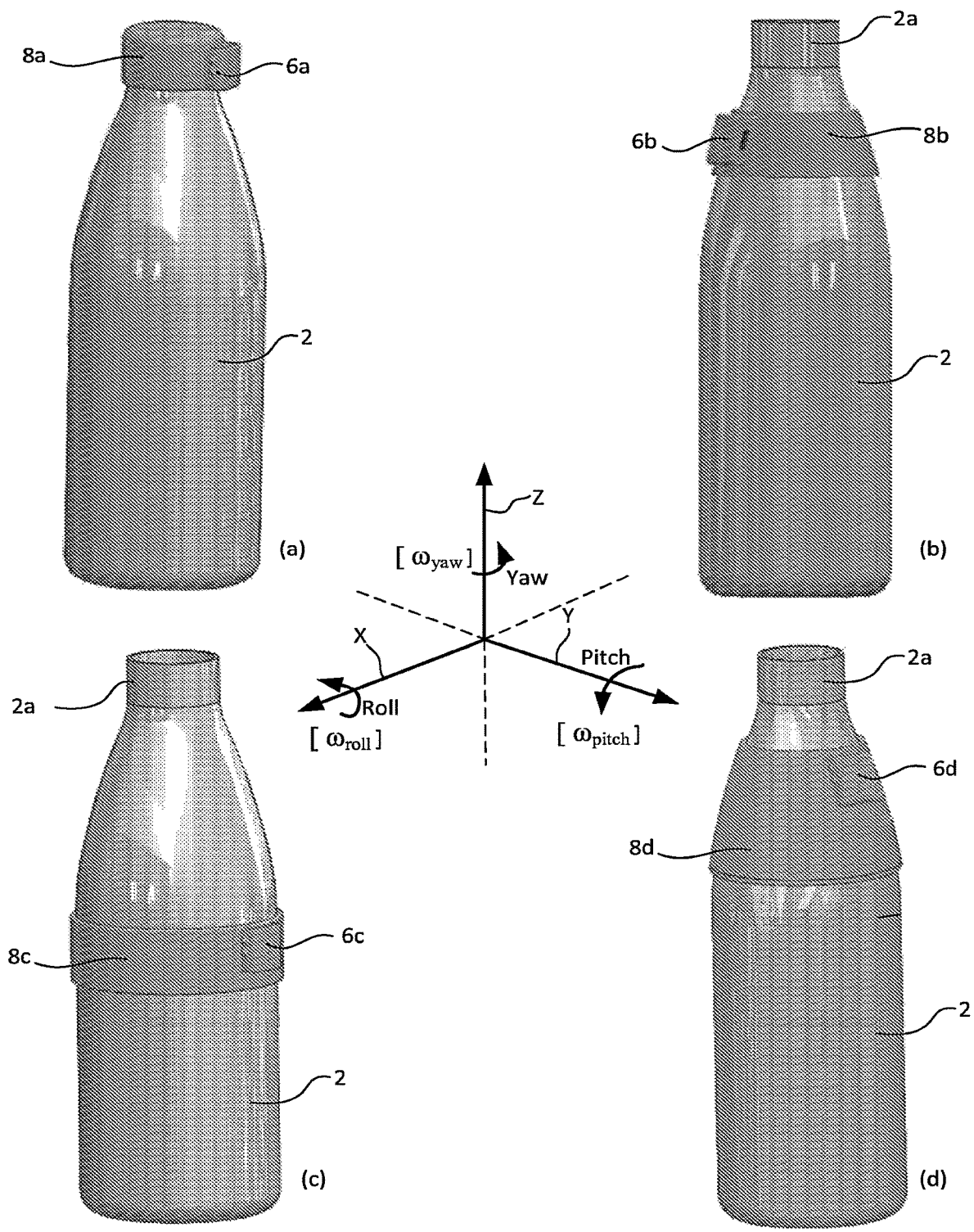
FIG. 2A shows details of four elasticated belts attached to a container with reference to a coordinate system, in accordance with some embodiments.

Reference is now made to FIG. 2A, which shows details of elasticated belts 8a, 8b, 8c and 8d re-attachable to a container 2 with reference to a coordinate system, in accordance with some embodiments. In view (a) elasticated belt 8a is shown attached over cap 2a (not shown) shown in views (b), (c) and (d). Each elasticated belts 8a-8d is re-attachable to respective containers 2a-2d by a user or player 34. Each elasticated belts 8a, 8b, 8c and 8d include respective housings 6a, 6b, 6c and 6d in respective views (a), (b), (c) and (d) and are utilizable to house apparatus 18 (not shown).

In view (a), elasticated belt 8a includes a housing 6a that houses apparatus 18. In view (b) elasticated belt 8b is shown attached around the upper part of neck of container 2 and includes a housing 6a that houses apparatus 18. In view (c), elasticated belt 8c is shown attached around the mid-section of container 2 and includes a housing 6c that houses apparatus 18. In view (d), elasticated belt 8d is shown attached around the entire neck section of container 2 and includes a housing 6c that houses apparatus 18. Axis Z may be representative of the vertical or longitudinal axis of container 2 that runs from cap 2a to the bottom end of container 2. Whereas axes X and Y are the latitudinal axes that are at right angle to each other.

Accelerometer sensor 44 measures the acceleration ($A_X$, $A_Y$ and $A_Z$) in meters (m) per second (s) each second (ms$^2$) of container 2 with respect to the three axes X, Y and Z of apparatus 18. Gyroscope sensor 42 is utilized to measure the angular ($\omega$, radians per second) velocities $\omega_{roll}$, $\omega_{pitch}$, $\omega_{yaw}$, in terms of roll, pitch and yaw of container 2 about axes X, Y and Z respectively. Apparatus 18 may include a battery to power apparatus 18. The battery may be re-chargeable via a universal serial bus (USB) socket. Alternatively a moving magnet and coil arrangement in which use of super capacitor and rectifier are used for many charges of the battery or super capacitor without the need to connect to an electrical outlet to charge the battery. Additional buttons (not shown) may connect electrically to apparatus 18 and both a barcode on the surface of container 2 (not shown) and buttons and their use may help to define which game is to be played and the menu selections of a game menu plan available for a particular game event.

Figure 2B:
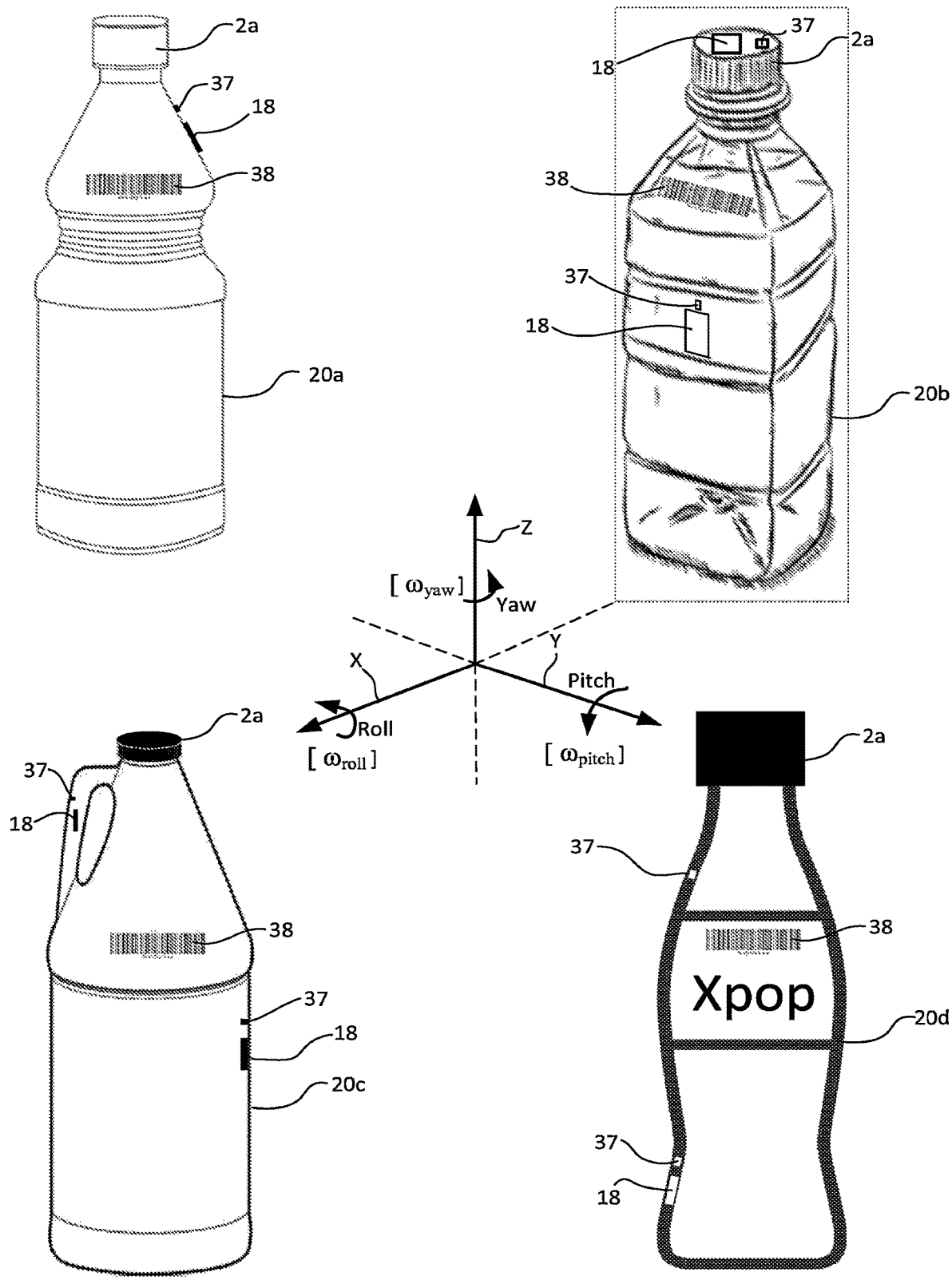
FIG. 2B shows details of four monolithic containers with reference to a coordinate system, in accordance with some embodiments.

Reference is now made to FIG. 2B, which shows details of apparatus 18 and button 18 attached to a container 20 with reference to a coordinate system, in accordance with some embodiments. With respect to the coordinate system, the Z-axis may be representative of the vertical or longitudinal axis of containers 20a-20d that runs from cap 2a to the bottom end of each container 20a-20d. Whereas axes X and Y are the latitudinal axes that are at right angle to each other. As with containers 2, containers 20a-20c include accelerometer sensor 44 that measures the acceleration ($A_X$, $A_Y$ and $A_Z$) in meters (m) per second (s) each second ($ms^2$) of containers 20a-20d with respect to the three axes X, Y and Z of apparatus 18. Gyroscope sensor 420 is utilized to measure the angular (o, radians per second) velocities $\omega_{roll}$, $\omega_{pitch}$, $\omega_{yaw}$, in terms of roll, pitch and yaw of containers 20a-20d about axes X, Y and Z respectively. Apparatus 18 may include a battery to power apparatus 18. The battery may be re-chargeable via a universal serial bus (USB) socket (not shown in drawings). Alternatively a moving magnet and coil arrangement in which use of super capacitor and rectifier are used for many charges of the battery or super capacitor without the need to connect to an electrical outlet to charge the battery. Each apparatus 18 and button 37 is shown attached to inner and/or outer surfaces of containers 20a-20c. With respect to container 20d, apparatus 18 and button 37 are an integral part inside the wall material of container 20d by virtue of an injection molding process used in the manufacture of container 20d.

Whereas, bonding apparatus 18 and button 37 to the outer or inner wall material of containers 20a-20c may be with the same material as the wall material or use of another adhesive appropriate to bond to the outer or inner wall material and to cover apparatus 18 and button 37. The covering/bonding of cover apparatus 18 and button 37 to provide waterproofing, protective mechanical rigidity and to maintain electrical connectivity of the components of apparatus 18 to a USB socket and electrical connection button 37 and apparatus 18. Button 37 may be implemented as a touch sensor that may utilize 5-Wire Resistive, Surface Capacitive, Projected Capacitive, SAW (Surface Acoustic Wave), and Infrared (IR) for example. Communication interface 3 (not shown) of apparatus 18 may also connect to another computing device via a universal serial bus (USB) cable plugged into a USB socket of apparatus 18. Communication interface 3 of apparatus 18 may also connect to cloud 13 and mobile phone 11, tablet 7, CTSM 8 and personal computer (PC) 9 by WiFi™, Bluetooth™ and/or by near field communication (NFC).

Container 20a includes a barcode 38 and/or radio frequency (RF) identification (ID) chip on the neck of container 20a. In terms of the XY plane, a mainly circular cross section with varying diameters along the Z-axis exists from the cylindrical mid-section upwards towards cap 2a. Further, up the neck near cap 2a on the outside surface of container 20a is attached apparatus 18 and button 37 to make one monolithic integrated structure for container 20a. Button 37 connects electrically to apparatus 18 and both barcode 38 and button 37 and their use helps to define which game is to be played and the menu selections of a game menu plan available for a particular game event.

Container 20b includes a barcode 38 and/or radio frequency (RF) identification (ID) chip on the neck/shoulder section of container 20a. Container 20b further includes apparatus 18 and button 37 bonded to the mid-section of container 20a on the inside or the outside surface of container 2 to make one monolithic integrated structure for container 20b. Alternatively, apparatus 18 and button 37 may bonded to the inside or the outside of cap of container 20b. In terms of the XY plane a mainly square or rectangular cross section with varying widths to form ridges for grip along the Z axis exists for the mid-section upwards towards the shoulders/cap 2a. Button 37 connects electrically to apparatus 18 and both barcode 38 and button 37 and their use helps to define which game is to be played and the menu selections of a game menu plan available for a particular game event.

Container 20c includes a barcode 38 and/or radio frequency (RF) identification (ID) chip on the neck/shoulder section of container 20c. Container 20c further includes apparatus 18 and button 37 bonded to the mid-section of container 20c on the inside or the outside surface of container 2 to make one monolithic integrated structure for container 20c. Alternatively, apparatus 18 and button 37 may bonded to the inside or the outside of the carry handle of container 20c. In terms of the XY plane, a mainly cylindrical circular cross section form is along the Z axis exists for the mid-section. From the mid-section upwards towards the neck/shoulders/cap 2a the diameter of circular cross section reduces. Button 37 connects electrically to apparatus 18 and both barcode 38 and button 37 and their use helps to define which game is to be played and the menu selections of a game menu plan available for a particular game event.

Container 20d includes a barcode 38 and/or radio frequency (RF) identification (ID) chip on the neck/shoulder section of container 20c and a brand label "Xpop" for a drink also included in containers 20a-20d. The Container 20d further includes apparatus 18 and button 37 located in the bottom section of container 20d as integral parts inside the wall material of container 20d by virtue of an injection molding process used in the manufacture of container 20d. Alternatively, another button 37 may installed as shown in the shoulders or neck portion of container 20d inside the wall material by virtue of the injection molding process used. Included in the injection molding process may be the conductors to enable connection between USB socket, buttons 37 and apparatus 18 to make one monolithic integrated structure for container 20d. In terms of the XY plane an inward curved cylindrical circular cross section forms the bottom section, an outward curved cylindrical circular cross section forms the midsection section and an inward curved cylindrical circular cross section forms the shoulder/neck/cap 2a of container 20d along the Z axis. Buttons 37 connect electrically to apparatus 18 and both barcode 38 and button 37 and their use helps to define which game is to be played and the menu selections of a game menu plan available for a particular game event.

Figure 3A:
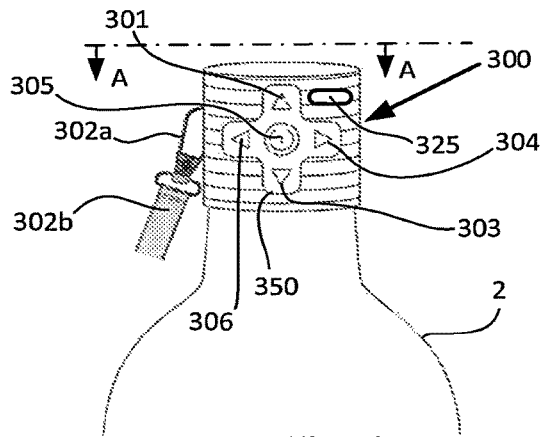
FIG. 3A shows details of an apparatus included in a cap assembly for different containers, in accordance with some embodiments.

Reference is now made to FIG. 3A, which shows details of apparatus 18 (not shown) included in a cap assembly 300 for a container 2 or containers 20a-20d, in accordance with some embodiments. Cap 2a in the descriptions above may be implemented as cap 300 that may be attached to container 2 and containers 20a-20d. Cap 300 has a button pad 350 that includes power button 305 and selection buttons 301, 303, 304 and 306. Button pad 300 and cover of selection buttons 301, 303, 304 and 306 may be an integral molded piece of silicon rubber that attaches to a recess in cap 300. Further a universal serial bus (USB) socket 325 and an attachment portion (not shown) that allows mechanical re-attachment of a buckle 302a and strap 302b arrangement to allow cap 300 and/or container to be carried around by a user or player 34 (not shown). Cap 300 may also include a ribbed surface (shown by horizontal lines) that may enable an easier grip of cap 300 when for example the "water bottle flipping challenge" is being played. The ribbed surface may also play a role in the cosmetic appeal of cap 300.

Apparatus 18 may include a battery to power apparatus 18. The battery may be re-chargeable via USB socket 325. Alternatively a moving magnet and coil arrangement in which use of super capacitor and rectifier are used for many charges of the battery or super capacitor without the need to connect to an electrical outlet to charge the battery. Buttons including Power button 305 and selection buttons 301, 303, 304 and 306 connect electrically to apparatus 18. Both barcode 38 on the surface of container 2 (not shown), RFID chip (not shown) and the buttons and their use may help to define which game is to be played and the menu selections of a game menu plan available for a particular game event. The buttons of button pad 350 may be implemented as a touch sensor that may utilize 5-Wire Resistive, Surface Capacitive, Projected Capacitive, SAW (Surface Acoustic Wave), and Infrared (IR) for example.

Communication interface 3 (not shown) of apparatus 18 may also connect to another computing device via a universal serial bus (USB) cable plugged into USB socket 325. Communication interface 3 of apparatus 18 may also connect to cloud 13, mobile phone 11, tablet 7, commercial touch screen monitor (CTSM) 8 and personal computer (PC) 9 (all not shown) by WiFi™, Bluetooth™ and/or by near field communication (NFC). Communication interface 3 may connect wirelessly to cloud 13 and mobile phone 11, tablet 7 and personal computer (PC) 9 that are included in game area 10a that a user or player 34 may utilize in game event 10. Processor 1 included in apparatus 18 may further include and/or be operatively connected to a random access (RAM), read only memory (ROM) and/or a cloud storage memory. Cloud 13 may also connect wirelessly to mobile phone 11, tablet 7 and PC 9. Mobile phone 11, tablet 7, CTSM 8 and PC 9 may also connect to a wireless hotspot 14 or to a router by a cable or may connect wirelessly. Wireless hotspot 14 may also connect directly to cloud 13.

Power button 305 and selection buttons 301, 303, 304 and 306 may further include red green blue (RGB) light emitting diodes (LEDs) that light up according to status. For example, a press of a couple of seconds or so of Power button 305 may turn ON or OFF apparatus 18. The status of apparatus 18 being ON may and operating, may be indicated by a red light of the LED of Power button 305 and charging of the battery of apparatus 18 indicated by flashing red light. Further, the status of apparatus 18 being ON and pairing with WiFi™, Bluetooth™ and near field communication (NFC) may be indicated flashing blue light followed by a continuous blue light of the LED of Power button 305 to indicate that apparatus 18 is "paired" successfully. Whereas, a short press of less than a second Power button 305 indicated by green light of the LED of Power button 305, may be utilized as a way to confirm a selection from a menu displayed on a display of mobile phone 11, tablet 7, commercial touch screen monitor (CTSM) 8 or personal computer (PC) 9. The selection may also be enabled by apparatus 18 sensing movements of player 34 moving container 2 left or right or forwards and backwards achieve the appropriate location on the menu where the confirmation of the selection may be made by the user or player 34 pressing Power button 305. The selection may also be enabled by pressing buttons 301[up], 304[right], 303[down] and 306[left] left or right or down and up to achieve the appropriate location on the menu where the confirmation of the selection may be made by the user or player 34 pressing Power button 305.

In general, pressing of buttons 301, 303, 304 and 306 may be indicated by a flash of a colored light (green for example) of the RGB LEDs that may be included in buttons 301, 303, 304 and 306. Vibrations of cap 300 may also make an indication of the selection by the inclusion of a vibration engine in cap 300. The selections by use of buttons of button pad 350 and apparatus 18 sensing movements of player 34 moving container 2 left or right or forwards and backwards in combination may be used and included in a game mode use of apparatus 18 included in cap 300. The combination in the game mode to move a cursor or an avatar of a bat, displayed on a display of mobile phone 11, tablet 7, commercial touch screen monitor (CTSM) 8 and personal computer (PC) 9 during a game event. Therefore, the selections and the combination may be included in what may be described as a joystick mode of use of apparatus 18/cap 2a, other cap assemblies and containers 2, 20a-20d described in greater detail below.

Figure 3B:
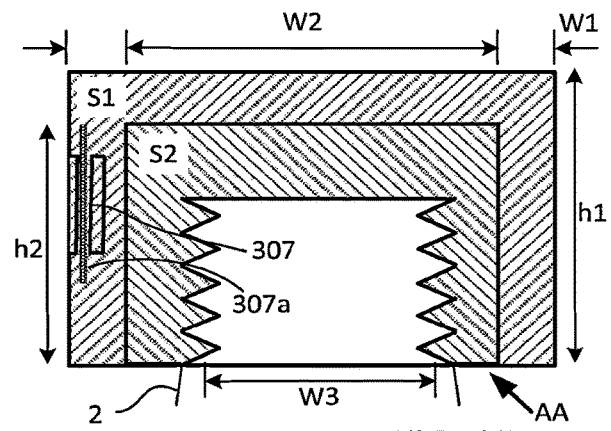
FIG. 3B shows a cross section of a cap assembly for a container or containers, in accordance with some embodiments.

Reference is now made to FIG. 3B, which shows a cross section AA of cap assembly 300 for a container 2 or containers 20a-20d, in accordance with some embodiments. The cross section AA shows outer cap housing S1 surrounding and attached to inner cap housing S2. Inner cap housing S2 includes a molded screw thread opening of varying width W3 in order to fit the corresponding thread of container 2. Inner cap housing S2 may be formed using an injection molding process made using a plastic material suitable for food, beverage, catering and other fields. The plastic material may be Polypropylene or Polyethylene for example. In a similar way, in a separate process, outer cap housing S1 may be formed using an injection molding process made using a more rigid plastic material that may include metal insert 307a, or manufactured from metal such aluminum or carbon fiber. Metal insert 307a may be utilized to strengthen pillar 307 located in a recess of the outside side of outer cap housing S1. Pillar 307 may be utilized to enable the mechanical re-attachment of a buckle 302a and strap 302b to cap assembly 300.

Width W2 of inner cap housing S2 may be of a defined size to accommodate the varying width W3 required fit the corresponding thread of the finish or the mouth of container 2. The defined size may enable supply of inner cap housing S2 for various sizes and types of corresponding threads of the finish or the mouth of container 2 or other ways of reattaching inner cap housing S2 to the finish or the mouth of container 2. The defined size further may enable defined dimensions for outer cap housing S1 in terms of width W2 that enables outer cap housing to be placed over and be re-attachable to inner cap housing S2. Defined dimensions for outer cap housing S1 may then determine width W1 for the material used to manufacture outer cap housing S1. Defined dimensions for outer cap housing S1 may also allow for a difference in height h1 for outer cap housing S1 to extend and be greater than height h2 of inner cap housing S2. The difference in height h1 for outer cap housing S1 allows a possible contact of the walls of outer cap housing S1 to seal against the neck of container 2 to perform a secondary sealing to the sealing between threads of the finish or the mouth of container 2 to the corresponding threads of inner cap housing S2. The possible contact of the walls of outer cap housing S1 to seal against the neck of container 2 may serve as a primary sealing if threads of the mouth of container 2 do not correspond to the threads of inner cap housing S2.

Figure 3C:
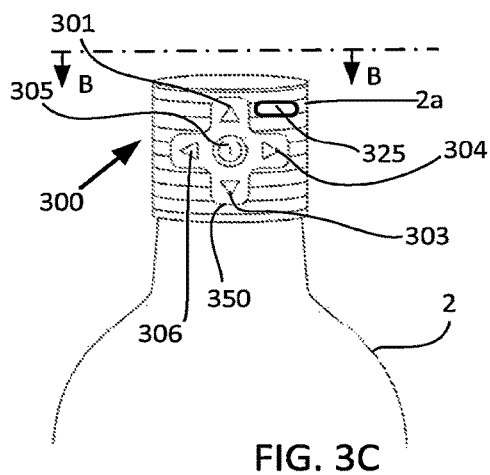
FIG. 3C and FIG. 3D, which show details of an apparatus 18 included in a cap assembly and a cross section of a cap assembly respectively for a container or containers, in accordance with some embodiments.
Figure 3D:
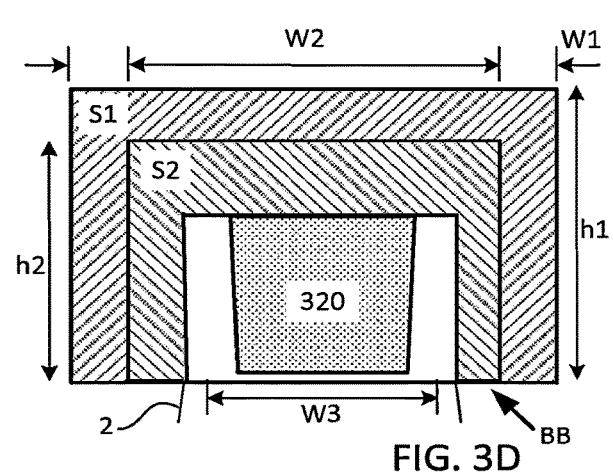

Reference is now made to FIG. 3C and FIG. 3D, which show details of apparatus 18 (not shown) included in a cap assembly 300 and a cross section BB of cap assembly 300 respectively for a container 2 or containers 20a-20d, in accordance with some embodiments. Cap 300 has a button pad 350 that includes Power button 305 and selection buttons 301, 303, 304 and 306. Button pad 300 and cover of selection buttons 301, 303, 304 and 306 may be an integral molded piece of silicon rubber that attaches to a recess in cap 300. Further a universal serial bus (USB) socket 325, however, unlike cap 300 of FIG. 3A, cap 300 does not have an attachment portion that allows mechanical re-attachment of a buckle 302a and strap 302b arrangement to allow cap 300 and/or container to be carried around by a user or player 34 (not shown). Cap 300 also includes a ribbed surface (shown by horizontal lines) that may enable an easier grip of cap 300 when for example the "water bottle flipping challenge" is being played. The ribbed surface may also play a role in the cosmetic appeal of cap 300.

The cross section BB shows outer cap housing S1 surrounding and attached to inner cap housing S2. Inner cap housing S2 includes a stopper or a bung 320 located in a varying width W3 and with a top of bung 320 attached to the underside of inner cap housing S2. Bung 320 may be made from silicone or cork. Width W2 of inner cap housing S2 may be of a defined size to accommodate the varying width W3 required to fit bung 320 into the finish or the mouth of container 2 by apply a downward pressure to the top of cap assembly 300. The defined size may enable supply of inner cap housing S2 for various sizes and types of corresponding apertures of the finish or the mouth of container 2 or other ways of reattaching inner cap housing S2 to the finish or the mouth of container 2. The defined size further may enable defined dimensions for outer cap housing S1 in terms of width W2 that enables outer cap housing to be placed over and be re-attachable to inner cap housing S2. Defined dimensions for outer cap housing S1 may then determine width W1 for the material used to manufacture outer cap housing S1. Defined dimensions for outer cap housing S1 may also allow for a difference in height h1 for outer cap housing S1 to extend and be greater than height h2 of inner cap housing S2. The difference in height h1 for outer cap housing S1 allows a possible contact of the walls of outer cap housing S1 to seal against the neck of container 2 to perform a secondary sealing by inserting bung 320 into the finish or the mouth of container. The possible contact of the walls of outer cap housing S1 to seal against the neck of container 2 may serve as a primary sealing if inserting bung 320 into the finish or the mouth is not sufficient.

Figure 3E:
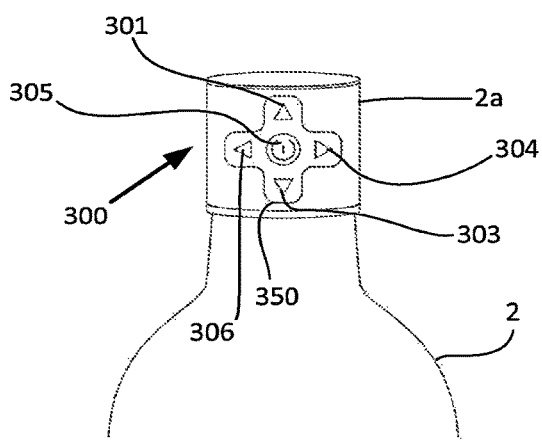
FIG. 3E and FIG. 3F, which show details of an apparatus 18 included in a cap assembly and a cross section of a cap assembly respectively for a container or containers, in accordance with some embodiments.
Figure 3F:
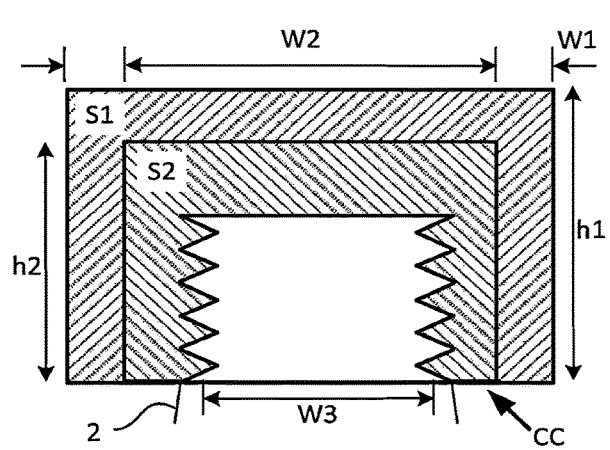

Reference is now made to FIG. 3E and FIG. 3F, which show details of apparatus 18 (not shown) included in a cap assembly 300 and a cross section CC of cap assembly 300 respectively for a container 2 or containers 20a-20d, in accordance with some embodiments. Cap 300 has a button pad 350 that includes Power button 305 and selection buttons 301, 303, 304 and 306. Button pad 300 and cover of selection buttons 301, 303, 304 and 306 may be an integral molded piece of silicon rubber that attaches to a recess in cap 300. Further a universal serial bus (USB) socket 325, however, unlike cap 300 of FIG. 3A, cap 300 does not have an attachment portion that allows mechanical re-attachment of a buckle 302a and strap 302b arrangement to allow cap 300 and/or container to be carried around by a user or player 34 (not shown). However, cap 300 does not include a ribbed surface. However, outer cap housing S1 may be similar to elasticated belt 8a that may include housing 6a to house apparatus 18 so that cap housing S1 can be stretched over inner cap housing S2 to attach outer cap housing S1 to inner cap housing S2. Unlike elasticated belt 8a, however, cap 300 has a button pad 350 that includes Power button 305 and selection buttons 301, 303, 304 and 306. Yet however, the same elasticated material of elasticated belt 8a may be also used for button pad 300 and cover of selection buttons 301, 303, 304 and 306. The elasticated material may also provide sufficient grip for a player 34 so that the ribbed surface shown in the previous figures may not be required.

Width W2 of inner cap housing S2 may be of a defined size to accommodate the varying width W3 required fit the corresponding thread of the finish or the mouth of container 2. The defined size may enable supply of inner cap housing S2 for various sizes and types of corresponding threads of the finish or the mouth of container 2 or other ways of reattaching inner cap housing S2 to the finish or the mouth of container 2. The defined size further may enable defined dimensions for outer cap housing S1 in terms of width W2 that enables outer cap housing to be placed over and be re-attachable to inner cap housing S2. Defined dimensions for outer cap housing S1 may then determine width W1 for the material used to manufacture outer cap housing S1. Defined dimensions for outer cap housing S1 may also allow for a difference in height h1 for outer cap housing S1 to extend and be greater than height h2 of inner cap housing S2. The difference in height h1 for outer cap housing S1 allows a possible contact of the walls of outer cap housing S1 to seal against the neck of container 2 to perform a secondary sealing to the sealing between threads of the finish or the mouth of container 2 to the corresponding threads of inner cap housing S2. The possible contact of the walls of outer cap housing S1 to seal against the neck of container 2 may serve as a primary sealing if threads of the mouth of container 2 do not correspond to the threads of inner cap housing S2.

Figure 4:
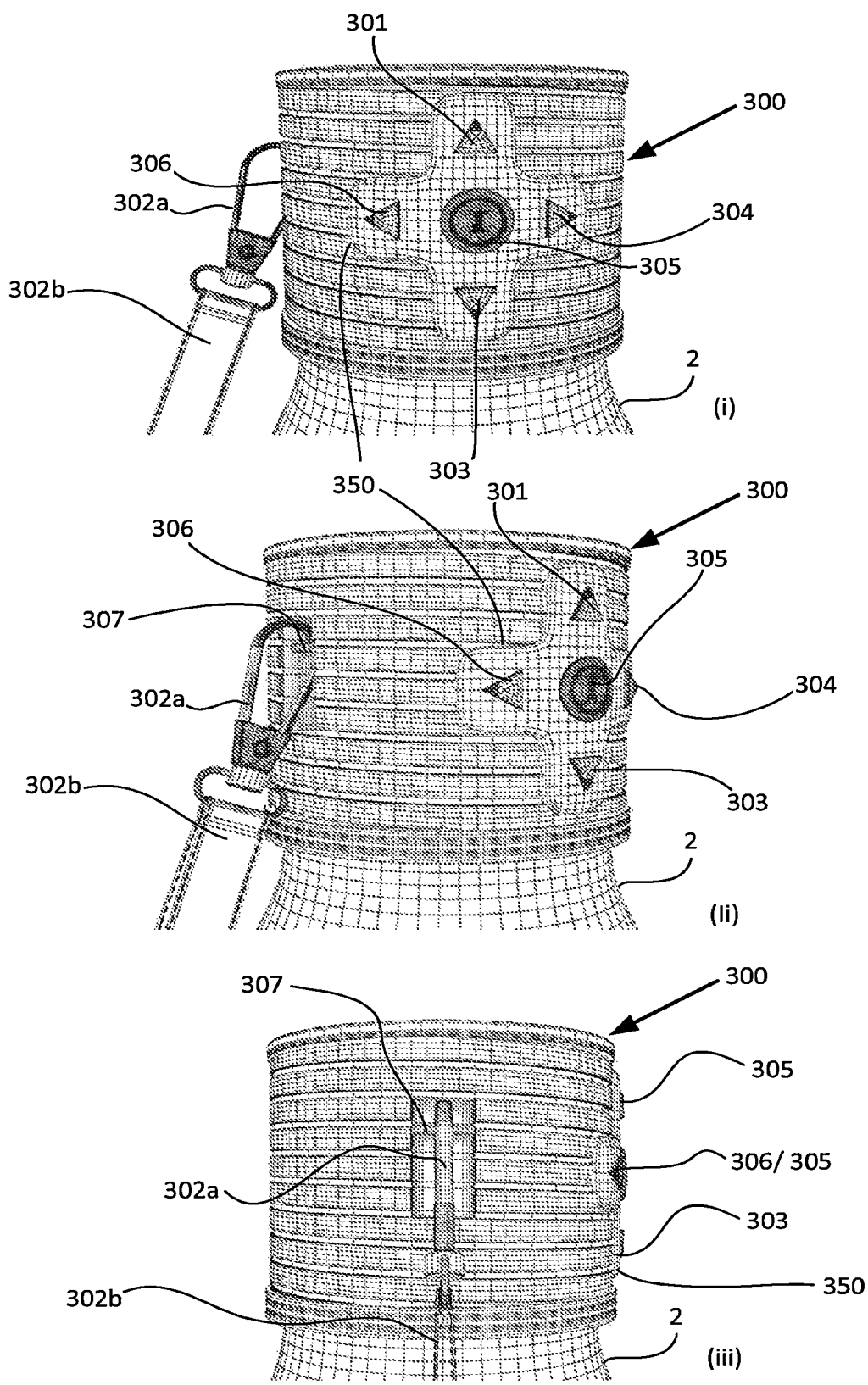
FIG. 4 shows details of an apparatus 18 included in three-dimensional drawings of a cap assembly for a container or containers, in accordance with some embodiments.

Reference is now made to FIG. 4, which shows details of apparatus 18 included in three-dimensional (3D) drawings of cap assembly 300 for a container 2 or containers 20a-20d, in accordance with some embodiments. In view (i), cap 300 has a button pad 350 that includes Power button 305 and selection buttons 301, 303, 304 and 306. Button pad 300 and cover of selection buttons 301, 303, 304 and 306 may be an integral molded piece of silicon rubber that attaches to a recess in cap 300. An attachment portion 307 allows mechanical re-attachment of a buckle 302a and strap 302b arrangement to allow cap 300 and/or container to be carried around by a user or player 34 (not shown).

Cap 300 may also include a ribbed or textured surface that may enable an easier grip of cap 300 when for example the "water bottle flipping challenge" is being played. The ribbed surface may also play a role in the cosmetic appeal of cap 300 as well as being able to unscrew cap 300 from the finish or the mouth of container 2 or to screw cap 300 onto the finish or the mouth of container 2. In view (ii) more detail of attachment portion 307 is shown where attachment portion 307 is perpendicular to the vertical recess in the outer wall of cap 300, whereas in FIG. 3B, attachment portion 307 is parallel to the vertical recess in the outer wall of cap 300. In view (iii) Power button 305 and selection buttons 301, 303, 304 and 306 are in relief relative to the surface of button pad 300.

Figure 5:
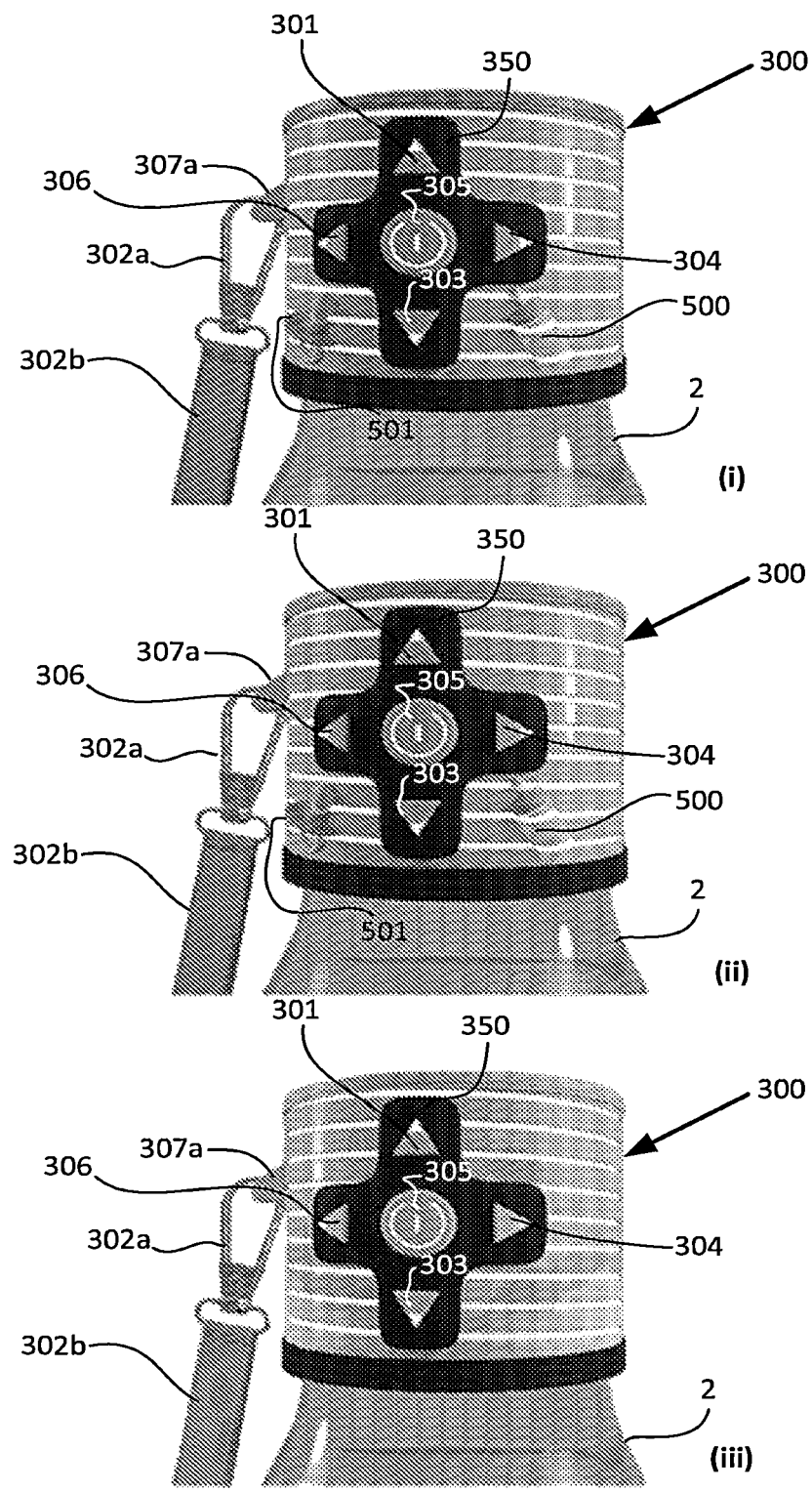
FIG. 5 shows details of an apparatus included in three-dimensional design drawings of a cap assembly for a container or containers, in accordance with some embodiments.

Reference is now made to FIG. 5, which shows details of apparatus 18 included in three dimensional design drawings of cap assembly 300 for a container 2 or containers 20a-20d, in accordance with some embodiments. In views (i), (ii) and (iii), cap 300 has a button pad 350 that includes Power button 305 and selection buttons 301, 303, 304 and 306. Button pad 300 and cover of selection buttons 301, 303, 304 and 306 may be an integral molded piece of silicon rubber that attaches to a recess in cap 300. An attachment portion 307a attached to the vertical portion of cap 300 as a protruding silicone tab that allows mechanical re-attachment of a buckle 302a and strap 302b arrangement to allow cap 300 and/or container to be carried around by a user or player 34 (not shown). Cap 300 may also include a textured or a ribbed surface (shown by horizontal recess lines) that may enable an easier grip of cap 300 when for example the "water bottle flipping challenge" is being played.

The ribbed and colored surfaces may also play a role in the cosmetic appeal of cap 300 as well as being able to unscrew cap 300 from the finish or the mouth of container 2 or to screw cap 300 onto the finish or the mouth of container 2. View (i) may be implemented in a pastel violet color and further includes relief images of a pacifier 501 and feeding bottle 500. View (ii) may be implemented in pastel purple color and further includes relief images of a pacifier 501 and feeding bottle 500. View (iii) may be implemented in pastel blue color and includes various images of clouds, rainbows and hot air balloons.

Figure 6A:
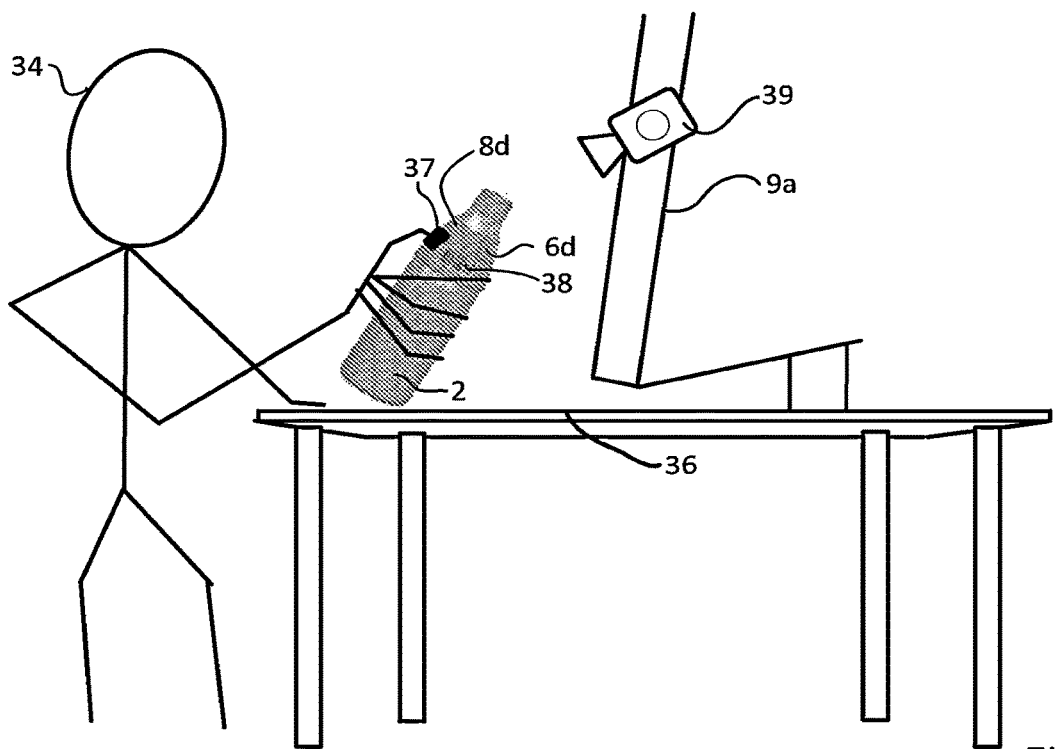
FIG. 6A shows details of a utilization of an elasticated belt that may be attached to the mid-section of a container or containers, in accordance with some embodiments.

Reference is now made to FIG. 6A, which shows details of a utilization of elasticated belt 8d that may be attached to the mid-section of a container 2 or containers 20a-20d, in accordance with some embodiments. Elasticated belt 8d may further include button 37 electrically and mechanically attached to apparatus 18 housed in housing 6d (not shown). Elasticated belt 8d may further include a barcode 38. Similarly, elasticated belts 8a, 8b and 8c may also include button 37 and/or barcode 38. The utilization shows a user or player 34 stood next to a table 36 that includes a monitor 9a and webcam 39 of personal computer (PC) 9 (not shown).

By way of non-limiting example, the user or player 34 is shown using container 2 in the joystick mode described above to include the enabling of a selection from a menu displayed on monitor 9a to enable player 34 to select the parameters of a game event 10. The selection of the parameters of game event 10 may be further enabled by webcam 39 utilized to scan barcode 38. The scanning of barcode 38 helps to define which game is to be played and the menu selections available for a particular game event 10. The selection from the menu displayed on monitor 9a enables player 34 to select the parameters of a game event 10. The selection is enabled by apparatus 18 sensing movements of player 34 moving container 2 left or right or forwards and backwards achieve the appropriate location on the menu where the confirmation of the selection may be made by the user or player 34 pressing button 37.

Other ways of selection by the player 34 moving container 2 in the joystick mode and apparatus 18 sensing left or right or forwards and backwards, may be from a selection displayed on mobile phone 11, CTSM 8 or tablet 7. Container 2 placed and moved on another surface, waved in midair or moved on the knee of the user or player 34. Barcode 38 may be scanned by an inbuilt camera or a near field communication (NFC) used to scan an RF ID chip included with the barcode or in the body of elasticated belt 8d. The scanning of the inbuilt camera or the RF ID chip define which game is to be played and the menu selections available for a particular game event 10 to be displayed on mobile phone 11, CTSM 8 or tablet 7.

Figure 6B:
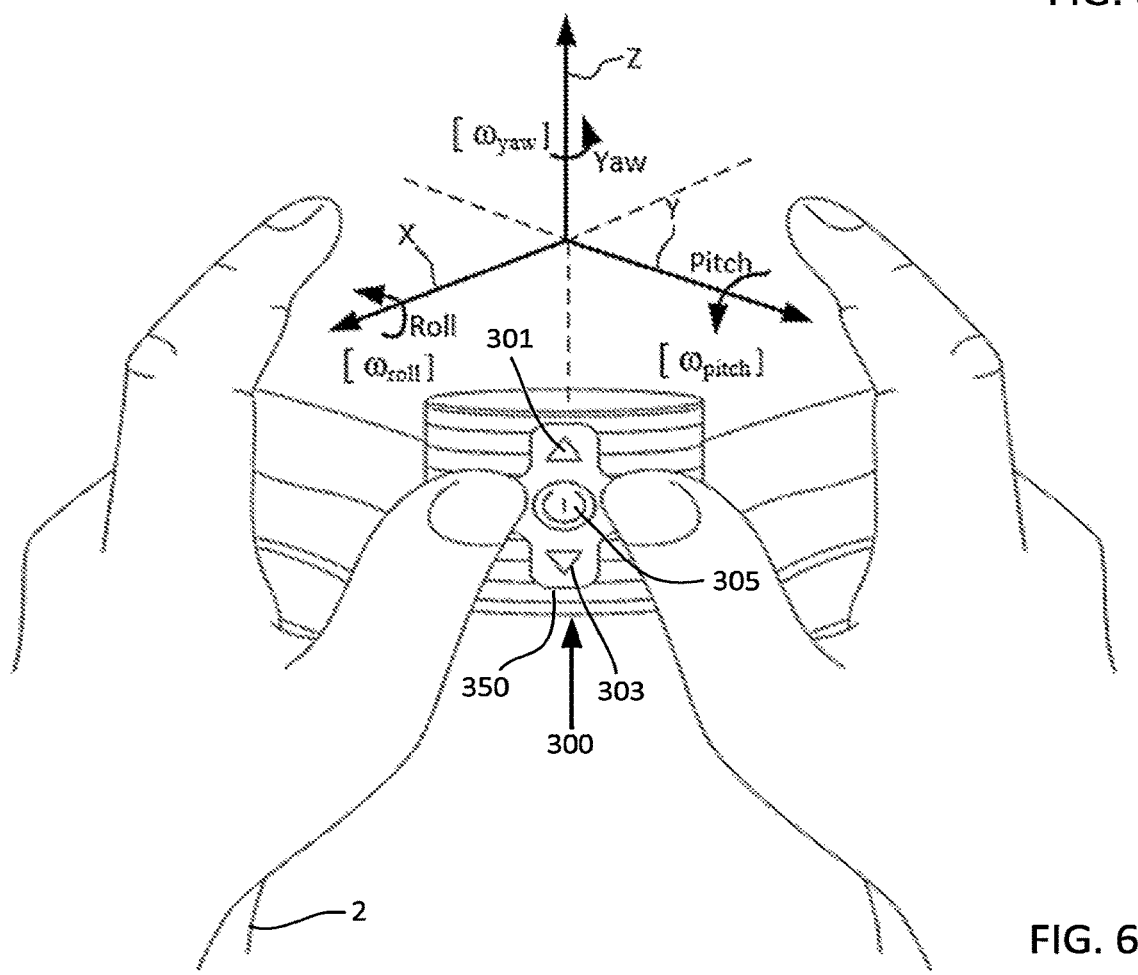
FIGS. 6B and 6C show details of a utilization of a cap attachable to a container or containers in accordance with some embodiments.
Figure 6C:
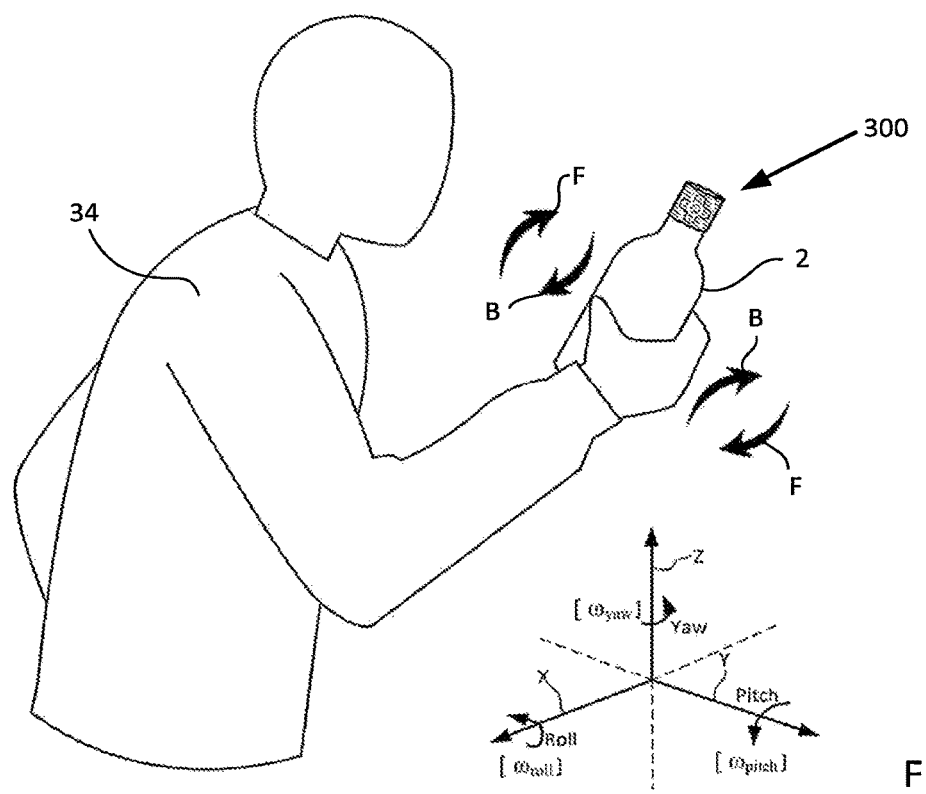

Reference is now made to FIGS. 6B and 6C, which show details of a utilization of cap 300 attachable to container 2 or containers 20a-20d with reference to a coordinate system, in accordance with some embodiments. The hands of player 34 shows their index fingers in a vertical position not touching container 2 or cap 300. The middle, ring and little fingers of both hands are wrapped around the back of cap 300 and the neck of container 2, while the thumbs are covering buttons 304 and 306. Power button 305 and selection buttons 301, 303, 304 (covered by right thumb) and 306 (covered by left thumb) may further include red green blue (RGB) light emitting diodes (LEDs) that light up according to status. For example, a press of a couple of seconds or so of power button 305 may turn ON or OFF apparatus 18. The status of apparatus 18 being ON may and operating, may be indicated by a red light of the LED of Power button 305 and charging of the battery of apparatus 18 indicated by flashing red light. Container 2 and/or cap 300 may further include a radio frequency identification (RFID) chip (not shown) or barcode 38 (not shown).

Further, the status of apparatus 18 being ON and pairing with WiFi™, Bluetooth™ and near field communication (NFC) may be indicated flashing blue light followed by a continuous blue light of the LED of Power button 305 to indicate that apparatus 18 is "paired" successfully. Whereas, a short press of less than a second Power button 305 indicated by green light of the LED of Power button 305, may be utilized as a way to confirm a selection from a game menu plan displayed on a display of mobile phone 11, tablet 7, commercial touch screen monitor (CTSM) 8 or personal computer (PC) 9. The configuration of the game menu plan may be by sensor unit 4 enabling scanning of the RFID chip or barcode 38. The selection may also be enabled by apparatus 18 sensing movements of player 34 moving container 2 left (Roll) or right (Roll) or forwards F (Pitch) and backwards B (Pitch) in mid-air to achieve the appropriate location on the menu where the confirmation of the selection may be made by the user or player 34 pressing power button 305. The selection may also be enabled by pressing buttons 301[up], 304[right], 303[down] and 306 [left] to achieve the appropriate location on the game menu plan where the confirmation of the selection may be made by the user or player 34 pressing Power button 305.

Pressing of buttons 301, 303, 304 and 306 may be indicated by a flash of a colored light (green for example) of the RGB LEDs that may be included in buttons 301, 303, 304 and 306. Vibrations of cap 300 may also make an indication of the selection by the inclusion of a vibration engine in cap 300. In a combination of use of buttons of button pad 350 and apparatus 18 sensing movements of player 34 moving container 2 left or right or forwards and backwards in midair may enable the selection from the game menu plan displayed. Further, the combination may also enable in a game event chosen as a result of the selection, to move a cursor or an avatar of a bat, displayed on a display of mobile phone 11, tablet 7, commercial touch screen monitor (CTSM) 8 and personal computer (PC) 9 during the game event. Therefore, the selection and the combination may be included in what may be described as a joystick mode of use of apparatus 18/cap 2a, cap assembly 300 and containers 2, 20a-20d.

With respect to "water bottle flipping challenge" as an example of the game event chosen, the coordinate system, axis Z may be representative of the vertical or longitudinal axis of container 2 that runs from cap 300 to the bottom end of container 2. Whereas axes X and Y are the latitudinal axes that are at right angle to each other. Accelerometer sensor 44 measures the acceleration ($A_X$, $A_Y$ and $A_Z$) in meters (m) per second (s) each second ($ms^2$) of container 2 with respect to the three axes X, Y and Z of apparatus 18 (not shown) included in cap 300 and operatively attached to button pad 350. Gyroscope sensor 42 may be utilized to measure the angular ($\omega$, radians per second) velocities $\omega_{roll}$, $\omega_{pitch}$, $\omega_{yaw}$, in terms of Roll, Pitch and Yaw of container 2 about axes X, Y and Z respectively.

Figure 7:
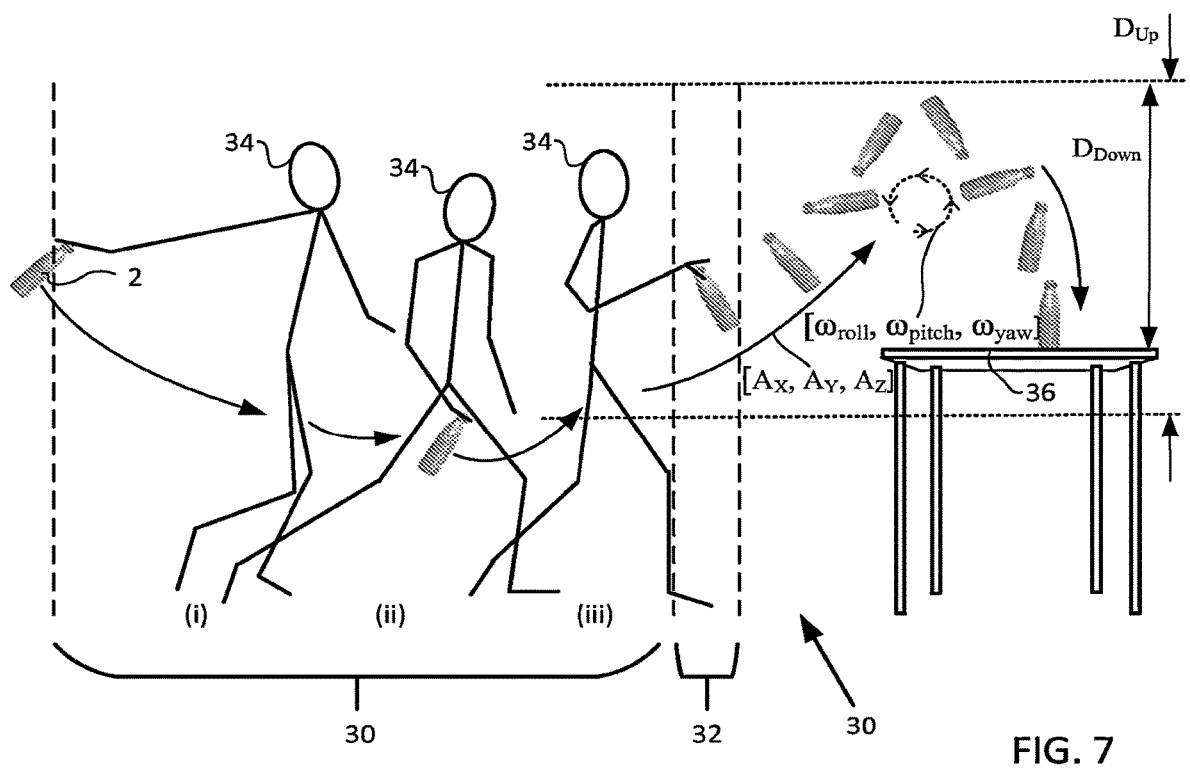
FIG. 7 shows by way of non-limiting example, details of a bottle flip game that utilizes the apparatus of FIG. 1A housed in a housing and re-attachable to a container by an elasticated cap, in accordance with some embodiments.

Reference is now made to FIG. 7, which shows by way of non-limiting example, details of a bottle flip game 30 utilizing apparatus 18 housed in housing 6a and attached to a container 2 by elasticated belt 8a, in accordance with some embodiments. Before the commencement of the bottle flip game 30 a user or a player 34 may use container 2 in a joystick mode. The joystick mode as described above enables a selection from a menu displayed on monitor 9, mobile phone 11, CTSM 8 or tablet 7, to enable player 34 to select the game parameters of bottle flip game 30. The game parameters may include the number of rotations required in midair of container 2. The height and the distance ($D_{UP}$+$D_{DOWN}$) travelled by container 2 required in midair to landing on a surface and the settled orientation position required of container 2 upon landing on a surface such as the surface of table 36 for example.

In general, the kinematics of rotational motion of an object describes the relationships between the angles of rotation, angular velocity, angular acceleration, and only describes motion. The kinematics of rotational motion of an object however, may not include any forces or masses that may affect rotation of the object as is with bottle flip game 30. Dynamics studies however, considers forces and their effect on motion that most aptly applies to bottle flip game 30 by virtue of a water bottle or container 2 being partially filled with a liquid or moveable objet such as a ball for example. The dynamics behind release phase 32 of container shows that the angular velocity of container 2 decreases dramatically, enabling a nearly vertical descent and a successful landing. The reduced rotation of container 2 on descent due to an increase of the moment of inertia, caused by the in-flight redistribution of the liquid mass along container 2.

Bottle flip game 30 includes three stages (i), (ii) and (iii) of delivery phase 30 and release phase 32 by player 34. Stage (i) begins where player 34 with container 2 swung backwards. Player 34 and container 2 accelerates forwards towards table 36 at stage (ii) where container 2 is now at the lowest point with respect to floor surface stood on by player 34. At stage (iii), player 34 stops their advance towards table 36 but container 2 continues accelerating upwards and towards table 36. A flipping toss action provides a force from player 34 is then applied to container 2 at release phase 32, where player 34 lets go of container 2.

Depending on how much acceleration $A_X$, $A_Y$ & $A_Z$ and the force from player 34 is applied to container 2, container 2 goes upwards in midair to height $D_{UP}$ relative to the lowest point with respect to floor surface stood on by player 34 at stage (ii) and also spins midair with angular velocities $\omega_{roll}$, $\omega_{pitch}$, $\omega_{yaw}$. How high upwards container 2 goes up to is also dependent on the force player 34 applies to container 2. At maximum height $D_{UP}$ relative to the surface of table 36, container 2 descends at a distance $D_{DOWN}$ in a near vertical descent to the tabletop of table 36, to land container 2 vertically upright on the bottom of container 2. Landing container 2 vertically upright on the bottom of container 2 may be according to the game parameters or criteria set by bottle flip game 30.

Satisfaction of the game parameters may include the processing of the sensing of digitized data values sensed by the sensors of sensor unit 4. The digitized data values being representative of angular velocities $\omega_{roll}$, $\omega_{pitch}$, $\omega_{yaw}$, accelerations $A_X$, $A_Y$ and $A_Z$ and distances $D_{Up}$, $D_{Down}$ in midair from a flipping toss from the user applied to container 2 at release phase 32. The processing of processor 1 may then calculate the digitized data values sensed in bottle flip game 30 to include the number of rotations in midair of container 2. The height and the distance ($D_{UP}$+$D_{DOWN}$) travelled by container 2 in midair to landing on a surface of table 36 and the settled orientation position of container 2 upon landing on the surface. The settled orientation position of container 2 may for example be on the cap end of container 2, the mid-section of container 2 or on the bottom end opposite the cap end of container 2. The processing may be performed by a cloud computing provision of cloud 13, mobile phone 11, tablet 7, CTSM 8 and personal computer (PC) 9 that are included in a game area that a user or player 34 may utilize in bottle flip game 30.

The processing of the sensing of digitized data values sensed by the sensors of sensor unit 4 may be conveyed via cloud 13 or wireless hotspot 14 near player 34 to another player in another location. The conveying of the processing may for example may provide an animated graphic on a computing device of the other player. The animated graphic may include an avatar an icon or a figure-representing player 34, the motion of container 2 and final landing orientation onto a defined surface. The conveying of the processing may be in near real-time of bottle flip game 30 to the other user or as a provision for an action replay that may be streamed or shared on a social media platform.

Figure 8:
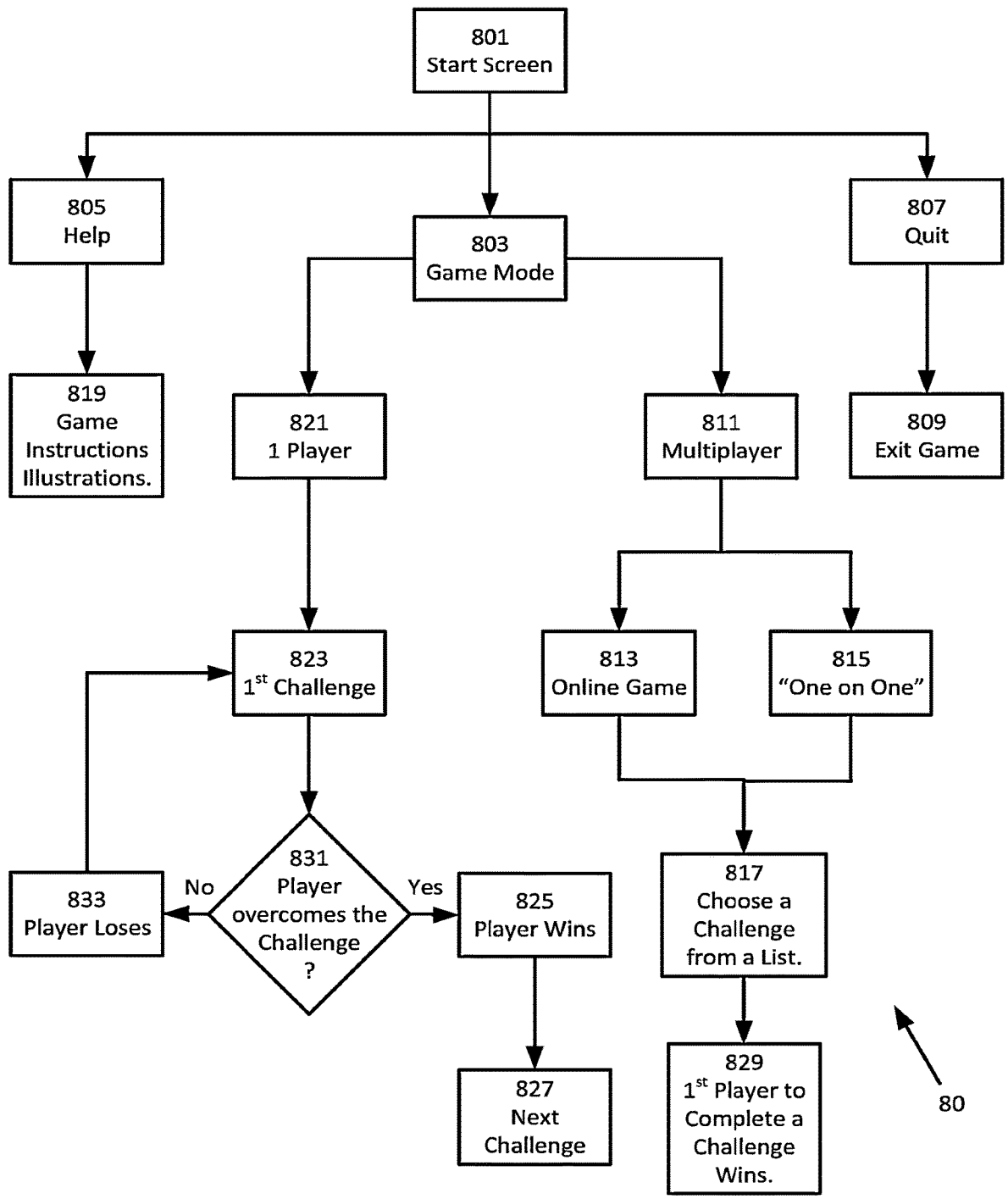
FIG. 8 shows by way of non-limiting example, details of a game menu plan in accordance with some embodiments.

Reference is now made to FIG. 8, which shows by way of non-limiting example, details of a game menu plan 80, in accordance with some embodiments. Game menu plan 80 may be implemented firstly in the joystick mode usage of apparatus 18 as described above. In the joystick mode, game menu plan 80 is displayed on monitor 9a, displayed on displays of mobile phone 11, CTSM 8 or tablet 7 for example. The selection of the parameters of a game event provided by game menu plan 80 may be further enabled by webcam 39 of PC 9, inbuilt cameras of mobile phone 11, CTSM 8 or tablet 7 that may be utilized to scan barcode 38. The scanning of barcode 38 helps to define which game is to be played and the menu selections of game menu plan 80 available for a particular game event. Subsequent to the joystick mode, apparatus 18 may be further utilized with games in general. Specifically with respect to bottle flip game 30 apparatus 18 is utilized to process, and then calculate the digitized data values sensed in bottle flip game 30. The digitized values to include the number of rotations in midair of container 2, the height and the distance ($D_{UP}$+$D_{DOWN}$) travelled by container 2 in midair to landing on a surface of table 36 and the settled orientation position of container 2 upon landing on the surface of table 36.

By way of example and to simplify the following descriptions, reference is made to bottle flip game 30 so that at step 801 of game menu plan 80, where a start screen may be presented on monitor 9a, displayed on displays of mobile phone 11, CTSM 8 or tablet 7. The start screen may be initiated by the scanning of barcode 38 to define which game is to be played and define the menu selections available for a particular game event. Use of container 2 in the joystick mode enables the selection of help step 805, game mode step 803 or quit step 807. Use of container 2 in the joystick mode may be where container 2 is placed and moved on another surface, waved in midair or moved on the knee of the user or player 34. Selection of quit step 807 leads to the exit of bottle flip game 30 in step 807. Selection of help step 805 leads to game instructions and game illustrations step 819. Game instructions in step 819 may include the amount of liquid or a moveable object to be placed in container 2, the height $D_{UP}$ to which container 2 is to be tossed, the number of rotations in midair of container 2 and the settled orientation position of 2 container upon landing on a surface. The surface may be a table top of table 36, a shelf attached to a wall or a ground surface on which container 2 has to land. Game instructions in step 819 may further include the distance required between table 36 and player 34.

Game illustrations in step 819 may include an animated graphic shown on a display of monitor 9a, or displayed on displays of mobile phone 11, CTSM 8 or tablet 7. The displays may include an avatar an icon or a figure representing a movement of a player 34, the resulting motion of container 2 and final landing orientation onto a defined surface. The movement of player 34 may include as shown in FIG. 7 includes stages (i), (ii) and (iii). Stage (i) begins where player 34 with container 2 swung backwards. Player 34 and container 2 accelerates forwards towards table 36 at stage (ii) where container 2 is now at the lowest point with respect to floor surface stood on by player 34. At stage (iii), player 34 stops their advance towards table 36 but container 2 continues accelerating upwards and towards table 36. A flipping toss action applied by player 34 provides a force applied to container 2 at release phase 32 where player 34 lets go of container 2. The resulting motion of container 2 and final landing orientation onto a defined surface may be shown on the displays to be dependent on the correct amount of acceleration and the force from player 34 is applied to container 2. The correct amount of acceleration and the force applied to container 2 further shows how container 2 goes upwards in midair to height $D_{UP}$ and the number of spins of container 2.

Selection of game mode at step 803 provides one player step 821 or multiplayer step 811. If player 34 selects one player step 821, player 34 receives their first challenge at challenge step 823 of bottle flip game 30. Challenge step 823 may be designed to increase the level of difficulty as player 34 overcomes each challenge at decision step 831 to win at step 825 and receive the next challenge at step 827. Different challenges at next challenge step 827 may also be designed to increase the level of difficulty as player 34 overcomes each challenge at decision step 831 to win at step 825. At decision step 831 a comparison is provided between a game criteria of the game event with the sensing and calculating of the dynamic movement of container 2 tossed by the one player 34 during the game event. The game criteria of bottle flip game 30 to the one player 34 may include for example the minimum height $D_{UP}$ for container 2 to reach, the number of turns of container 2 midair and container 2 to land cap end or bottom end. A win at step 825 may be indicated to the one player 34 for example on a graphic user interface (GUI) of monitor 9a, mobile phone 11, CTSM 8 or tablet 7.

Win step 825 may be an ongoing score of ongoing challenges included in a game event. When player 34 completes the required number of challenges, player 34 may be given a code on the GUI which can be utilized to claim a physical prize ordered from an online source for example. If a player 34 does not overcome a challenge according to a comparison at decision step 831, the player loses at step 833 and player 34 returns to challenge step 823. The comparison at decision step 831 may be between a game criteria of bottle flip game 30 with the sensing and calculating of the dynamic movement of container 2 tossed by the one player 34 during the game event of bottle flip game 30. The conveying of the processing may for example may be to provide an animated graphic on a computing device of the player 34. The animated graphic may include an avatar an icon or a figure-representing player 34, the motion of container 2 and final landing orientation onto a defined surface. The conveying of the processing and the animated graphic may be in near real-time of bottle flip game 30 to player 34 to another user or as a provision for an action replay that may be shared on a social media platform for example.

At game mode step 803 a player 34 may select multi-player step 811 to give a further option of selecting online game step 813 or one on one step 815. "One on one" step 815 may involve player 34 playing directly against a single opposing player involving a direct physical encounter between player 34 with the single opposing player. Whereas, selecting online game step 813 allows multiple players to play against each other over an internet connection for example. In either of online game step 813 or "one on one" step 815, players are invited to choose a challenge from a list of challenges at step 817. A winning outcome of bottle game 30 may be the first player to complete a challenge or to go beyond a particular score level. Completing the challenge first is subject to decision step 831 that may be between a game criteria of bottle flip game 30 with the sensing and calculating of the dynamic movement of container 2 tossed by each player during the game event of bottle flip game 30.

The conveying of the processing may for example may be to provide an animated graphic on a computing device of the players. The animated graphic may include an avatar an icon or a figure that represents a player 34, the motion of container 2 and final landing orientation onto a defined surface. The conveying of the processing and the animated graphic may be in near real-time of bottle flip game 30 to the players. The conveying may be as a provision for an action replay of the winning player that may be shared on a social media platform for example.

Figure 9:
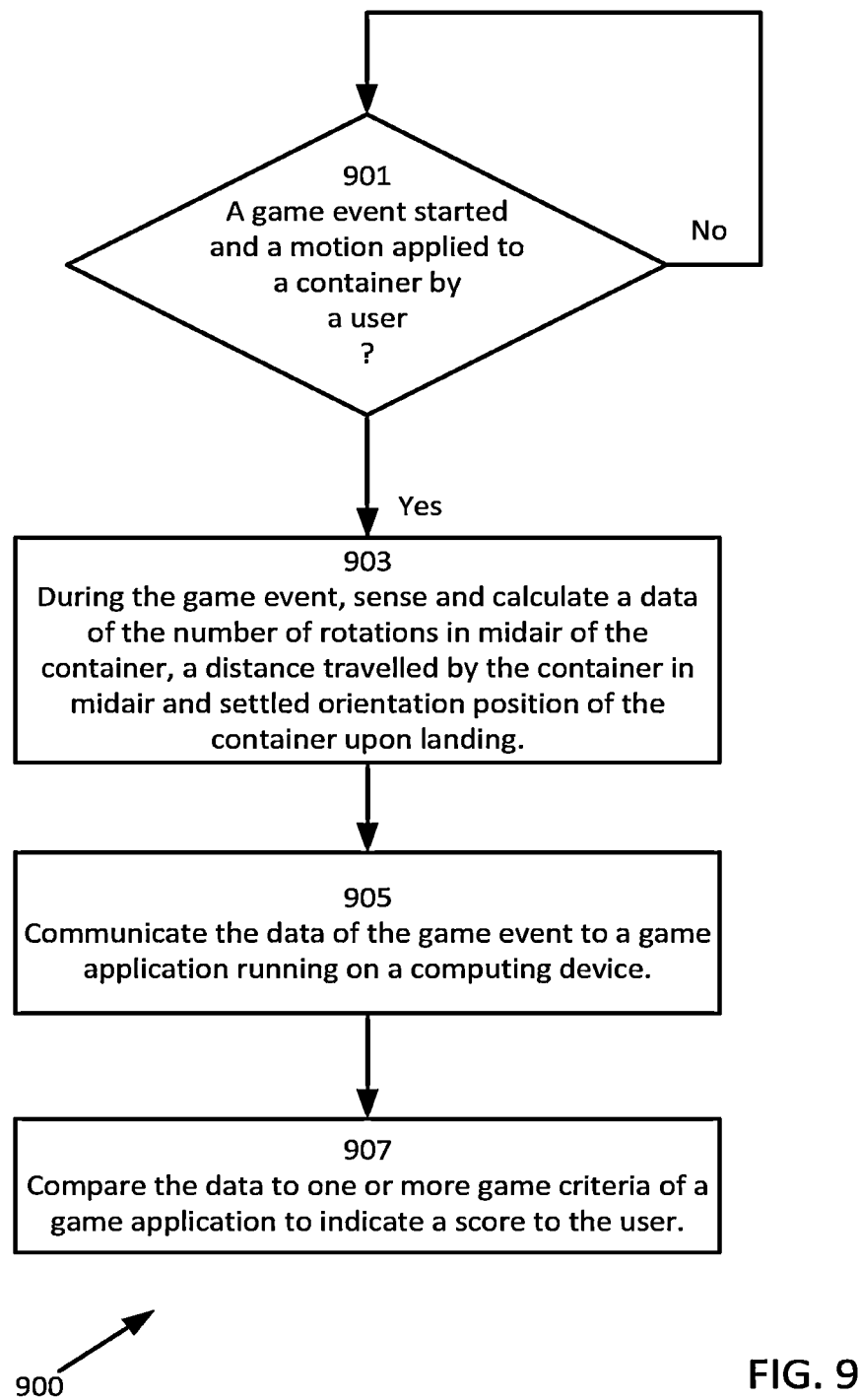
FIG. 9 shows a flowchart of a method, in accordance with some embodiments.

Reference is now made to FIG. 9, which shows a flowchart of a method 900, in accordance with some embodiments. In the description that follows by way of non-limiting example, reference is made to game menu plan 80 and to bottle flip game 30 as described above. At decision step 901, it is determined if a game event has started. Prior to decision step 901, the start of the game event may be indicated by a player 34 use of container 2 in the joystick mode to select the game parameters. Use of container 2 in the joystick mode may be where container 2 is placed and moved on another surface, waved in midair or moved on the knee of the user or player 34. The selection of the game parameters further enabled by a webcam of a computing device utilized by player 34 to scan barcode 38. The scanning of barcode 38 may also help to define which game is to be played and the menu selections available of game menu plan 80 for bottle flip game 30 on a display of the computing device of player 34 or user of container 2 in the joystick mode. A pressing of button 37 by player 34 may then indicate that a game event has started and a motion is being applied to container 34 by player 34 at decision step 901 to enable step 903.

At step 903 with reference to FIG. 7, bottle flip game 30 includes three stages (i), (ii) and (iii) of delivery phase 30 and release phase 32 by player 34. Stage (i) begins where player 34 with container 2 swung backwards. Player 34 and container 2 accelerates forwards towards table 36 at stage (ii) where container 2 is now at the lowest point with respect to floor surface stood on by player 34. At stage (iii), player 34 stops their advance towards table 36 but container 2 continues accelerating upwards and towards table 36. A flipping toss action provides a force from player 34 is then applied to container 2 at release phase 32, where player 34 lets go of container 2.

Satisfaction of the game parameters may include the processing of the sensing of digitized data values sensed by the sensors of sensor unit 4. The digitized data values being representative of angular velocities $\omega_{roll}$, $\omega_{pitch}$, $\omega_{yaw}$, accelerations $A_X$, $A_Y$ and $A_Z$ and distances $D_{Up}$, $D_{Down}$ in midair from a flipping toss from the user applied to container 2 at release phase 32. The processing of processor 1 may then calculate the digitized data values sensed in bottle flip game 30 to include the number of rotations in midair of container 2. The height and the distance ($D_{UP}+D_{DOWN}$) travelled by container 2 in midair to landing on a surface of table 36 and the settled orientation position of container 2 upon landing on the surface. The settled orientation position of container 2 may for example be on the cap end of container 2, the mid-section of container 2 or on the bottom end opposite the cap end of container 2.

Depending on how much acceleration $A_X$, $A_Y$ & $A_Z$ and the force from player 34 is applied to container 2, container 2 goes upwards in midair to height $D_{UP}$ relative to the lowest point with respect to floor surface stood on by player 34 at stage (ii) and also spins midair with angular velocities $\omega_{roll}$, $\omega_{pitch}$, $\omega_{yaw}$. How high upwards container 2 goes up to is also dependent on the force player 34 applies to container 2. At maximum height $D_{UP}$ relative to the surface of table 36, container 2 descends at a distance $D_{DOWN}$ in a near vertical descent to the tabletop of table 36, to land container 2 vertically upright on the bottom of container 2. Landing container 2 vertically upright on the bottom of container 2 may be according to the game parameters or criteria set by bottle flip game 30. The processing of the sensing of digitized data values sensed by the sensors of sensor unit 4 at step 903 may be conveyed via cloud 13 or wireless hotspot 14 near player 34 to another player in another location at step 905.

The conveying or communicating of the processing at step 905 may for example may provide an animated graphic on a computing device of the other player. The animated graphic may include an avatar an icon or a figure-representing player 34, the motion of container 2 and final landing orientation onto a defined surface. The conveying of the processing may be in near real-time of bottle flip game 30 to the other user or as a provision for an action replay that may be streamed or shared on a social media platform.

At step 907 in a game event of bottle flip game 30 by one or more players, a comparison is provided between a game criteria of bottle flip game 30 with the sensing and calculating of the dynamic movement of a bottle tossed by the one or more players during the game event at step 903. The game criteria of bottle flip game 30 to the one or more players may include for example the minimum height $D_{UP}$ for container 2 to reach, the number of turns of container 2 midair and container 2 to land cap end or bottom end. The comparison can then be indicated to one or more players for example on a graphic user interface (GUI) of their computing devices, as an ongoing score of ongoing challenges included in a game event of bottle flip game 30. The first player to complete the required number of challenges go beyond a particular score level may be the winner for example.

In sum, a brand label for both bottle caps 2a, 300, icons 501 and 502, containers 2 and 20a-20d may be used in promotion of sales of containers 2 and 20a-20. The use of buttons 37, 301, 303-306, barcodes 38 and apparatus 18 to provide a game event as a further incentive of sales of the brand label. As with containers 20a-20d, container 2 may include various cross sectional shapes with respect to the XY, ZY and ZX planes including circular, elliptical, triangular, rectangular and any polynomial shape. Further to include a controller embedded in the reusable sealing bottle cap. The controller interfaceable with a computing device. The controller enables a selection from a menu displayed on a display of the computing device to enable a player or user to select the parameters of a game event.

According to a first aspect, an apparatus re-attachable to a container or bottle, where movement of the container enables a selection from a menu displayed on a display to enable a player or user to select the parameters of a game event.

According to a second aspect, a sealing bottle or container cap assembly for a bottle having an open mouth and a neck extending down from the open mouth. The reusable sealing bottle cap assembly including an enclosed upper portion for enclosing the open mouth of the bottle and a depending skirt extending straight downwardly from the enclosed upper portion of the cap for securing the cap around a neck of a bottle to seal an open mouth of the bottle. The reusable sealing bottle cap including a controller embedded in the reusable sealing bottle cap. The controller interfaceable with a computing device. The controller enables a selection from a menu displayed on a display of the computing device to enable a player or user to select the parameters of a game event.

According to a third aspect a sensing of the dynamics of forces and their effect on motion that most aptly applies but is not limited to a "water bottle flipping challenge" by virtue of a bottle or container being partially filled with a liquid or with another moveable object such as a ball for example.

According to a fourth aspect in a game event by one or more players, a comparison is provided between a game criteria of the game event with the sensing and calculating of the dynamic movement of a bottle or container tossed by the one or more players during the game event. The game criteria of the game event to the one or more players may include for example the minimum height for a bottle to reach, the number of turns of the bottle midair and the bottle to land cap end or bottom end. The comparison can then be indicated as a score to the one or more players for example on a graphic user interface (GUI), as an ongoing score of ongoing challenges included in a game event.

According to a fifth aspect, the sensing and calculating of the dynamic movement of a bottle or container tossed by the one or more players may be may be conveyed via a cloud or wireless hotspot near a player to another player in another location. The conveying of the processing of the sensing may for example may provide an animated graphic on a computing device of the other player. The animated graphic may include an avatar, an icon or a figure that represents a player, the motion of the container and final landing orientation onto a defined surface. The conveying of the processing may be in near real-time of a "bottle flip game" to the other user or as a provision for an action replay that may be streamed or shared on a social media platform.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed:

1. An apparatus reattach-able to a container, the apparatus comprising:
   a processor;
   at least one sensor operatively attached to the processor, wherein the at least one sensor is configurable upon a toss applied by a user to a container to which said reattach-able apparatus is attached, to sense a data of at least one of a number of rotations in midair of the container attached with said reattach-able apparatus, a distance travelled by the container attached with said reattach-able apparatus in midair to landing on a surface and a settled orientation position of the container attached with said reattach-able apparatus upon landing on a surface; and
   a communication interface configured to transmit the data sensed during a game event to a game application running on a computing device, to provide an indication of a score to the user responsive to a comparison of the data to at least one game criteria of the game application;
   an elastic holster configured to attach the apparatus to at least one of a cap end of the container, a midsection of the container and a bottom end of the container.

2. The apparatus of claim 1, wherein the at least one game criteria of the game application defines at least one of an amount of liquid or a moveable object to be placed in the container, a height to which the container is to be tossed, the number of rotations in midair of the container and the settled orientation position of the container upon landing on a surface.

3. The apparatus of claim 2, wherein the settled orientation position of the container is at least one of a cap end of the container, a midsection of the container and a bottom end of the container.

4. The apparatus of claim 1, wherein the processing of the processor is provided from at least one of the computing device and a cloud computing provision.

5. The apparatus of claim 1, wherein the comparison of the data to at least one game criteria of the game application is provided from at least one of the processor, the computing device and a cloud computing provision.

6. The apparatus of claim 1, wherein the indication of a score to the user is provided on a graphical user interface (GUI) of at least one of the processor, the computing device and a cloud computing provision.

7. The apparatus of claim 1, wherein the at least one sensor is at least one of a micro-electromechanical system (MEMS) accelerometer, a MEMS gyroscope, MEMS compass, MEMS barometer and MEMS magnetic field sensor.

8. The apparatus of claim 1, wherein a cross sectional shape of the container is at least one of a spherical shape, triangular shape, rectangular shape or any polynomial shape.

9. An apparatus comprising:
   a bottle including a resealable cap end;
   a processor and at least one sensor electrically attached to the processor;

a communication interface electrically attached to the processor;

a housing mechanically attached to the bottle, wherein the housing houses the processor, the at least one sensor and the communication interface;

wherein the housing is a cap having an enclosed upper portion for securing the resealable cap to a neck of the bottle for at least partly sealing the open mouth of the bottle;

wherein the at least one sensor is configured to sense, upon a toss applied by a user to the bottle, a data of at least one of a number of rotations of the bottle in midair, a distance travelled by the bottle in midair to landing on a surface and a settled orientation position of the bottle upon landing on said surface.

10. The apparatus of claim 9, wherein the communication interface is configured to transmit a data sensed during a game event to a game application running on a computing device, to provide an indication of a score to the user responsive to a comparison of the data to at least one game criteria of the game application.

11. The apparatus of claim 9, wherein the housing and the container forms a monolithic structure.

12. The apparatus of claim 9, wherein a cross sectional shape of the container is at least one of a spherical shape, triangular shape, rectangular shape or any polynomial shape.

13. A reusable sealing bottle cap assembly for a bottle having an open mouth and a neck extending down from the open mouth, the reusable sealing bottle cap assembly consisting essentially of:

a cap having an enclosed upper portion for enclosing the open mouth of the bottle and a depending skirt extending straight downwardly from the enclosed upper portion of the cap for securing the cap around a neck of a bottle for at least partly sealing an open mouth of the bottle;

a controller embedded in the reusable sealing bottle cap;

a sensor unit configured to sense a motion of the reusable sealing bottle cap when said bottle is being tossed by a user; and a user interface operatively connected to controller, the user interface adapted to enable the user to select parameters of a game event displayed on a display of a computing device.

14. The reusable sealing bottle cap assembly of claim 13, further comprising a communication interface configured to transmit the data sensed during the game event to a game application running on a computing device, to provide an indication of a score to the user responsive to a comparison of the data to at least one game criteria of the game application.

15. The reusable sealing bottle cap assembly of claim 13 further comprising an inner housing and an outer housing, wherein said inner housing and said outer housing are configured to enable said outer housing to be placed over and be re-attachable to said inner housing, wherein said inner housing comprises said cap, and wherein said outer housing comprises said controller, said sensor unit and said user interface.

16. A method for a game event using a bottle having an apparatus attached thereto, wherein the apparatus includes a processor and at least one sensor, the method comprising:

upon a toss applied to the bottle by a user, sensing by the at least one sensor, and calculating by said processor, a data of at least one of a number of rotations in midair of the bottle, a distance travelled by the bottle in midair to landing on a surface and a settled orientation position of the bottle upon landing on a surface; and communicating, by the processor, the data sensed and calculated during the game event to a game application running on a computing device; and indicating a score to the user responsive to comparing the data to at least one game criteria of the game application.

17. The method of claim 16, wherein the at least one game criteria of the game application defines at least one of an amount of liquid or a moveable object to be placed in the bottle, a height to which the bottle is to be tossed, the number of rotations in midair of the bottle and the settled orientation position of the bottle upon landing on a surface.

18. The method of claim 16, wherein the settled orientation position of the bottle is at least one of a cap end of the bottle, a midsection of the bottle and a bottom end of the bottle.

19. The method of claim 16, wherein a processing of the processor is provided from at least one of the computing device and a cloud computing provision.

20. The method of claim 16, wherein the comparison of the data to at least one game criteria of the game application is provided from at least one of the processor, the computing device and a cloud computing provision.

21. The method of claim 16, further comprising indicating a score to the user on a graphical user interface (GUI) of at least one of the processor, the computing device and a cloud computing provision.

22. The method of claim 16, wherein the at least one sensor at least one of a micro-electromechanical system (MEMS) accelerometer, a MEMS gyroscope, MEMS compass, MEMS barometer and MEMS magnetic field sensor.

* * * * *